US006939919B2

(12) United States Patent
Tau et al.

(10) Patent No.: US 6,939,919 B2
(45) Date of Patent: Sep. 6, 2005

(54) POLYETHYLENE RICH/POLYPROPYLENE BLENDS AND THEIR USES

(75) Inventors: Li-Min Tau, Lake Jackson, TX (US); William R. Van Volkenburgh, Lake Jackson, TX (US); Wendy D. Hoenig, Beuhlertal (DE); Pak-Wing S. Chum, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 217 days.

(21) Appl. No.: 10/296,601

(22) PCT Filed: May 25, 2001

(86) PCT No.: PCT/US01/17119

§ 371 (c)(1),
(2), (4) Date: May 13, 2003

(87) PCT Pub. No.: WO01/92403

PCT Pub. Date: Dec. 6, 2001

(65) Prior Publication Data

US 2003/0216518 A1 Nov. 20, 2003

Related U.S. Application Data

(60) Provisional application No. 60/207,511, filed on May 26, 2000, provisional application No. 60/208,507, filed on May 31, 2000, provisional application No. 60/246,303, filed on Nov. 6, 2000, and provisional application No. 60/257,514, filed on Dec. 22, 2000.

(51) Int. Cl.[7] .......................... C08F 8/00; C08L 23/00; C08L 23/04
(52) U.S. Cl. ........................................ 525/191; 525/240
(58) Field of Search .................................. 525/191, 240

(56) References Cited

U.S. PATENT DOCUMENTS

| 3,058,944 A | 10/1962 | Breslow et al. |
| 3,203,936 A | 8/1965 | Breslow et al. |
| 3,203,937 A | 8/1965 | Breslow et al. |
| 3,282,864 A | 11/1966 | Bost et al. |
| 3,298,975 A | 1/1967 | Field et al. |
| 3,336,268 A | 8/1967 | Cox |
| 3,341,480 A | 9/1967 | Feild |
| 3,377,415 A | 4/1968 | Oppenlander |
| 3,389,198 A | 6/1968 | Taber |
| 3,530,108 A | 9/1970 | Oppenlander |
| 3,645,992 A | 2/1972 | Elston |
| 3,687,920 A | 8/1972 | Johnson |
| 3,893,989 A | 7/1975 | Leicht et al. |
| 3,914,342 A | 10/1975 | Mitchell |
| 3,959,425 A | 5/1976 | Herrington |
| 4,003,712 A | 1/1977 | Miller |
| 4,031,068 A | 6/1977 | Cantor |
| 4,076,698 A | 2/1978 | Anderson et al. |
| 4,113,802 A | 9/1978 | Matteoli et al. |
| 4,200,556 A | 4/1980 | Robinson et al. |
| 4,352,892 A | 10/1982 | Lohmar |
| 4,532,189 A | 7/1985 | Mueller |
| 4,579,905 A | 4/1986 | Krabbenhoft |
| 4,584,347 A | 4/1986 | Harpell et al. |
| 4,694,025 A | 9/1987 | Park |
| 4,714,716 A | 12/1987 | Park |
| 4,820,471 A | 4/1989 | van der Molen |
| 4,916,198 A | 4/1990 | Scheve et al. |
| 5,008,204 A | 4/1991 | Stehling |
| 5,037,895 A | 8/1991 | Marker et al. |
| 5,116,881 A | 5/1992 | Park et al. |
| 5,180,751 A | 1/1993 | Park et al. |
| 5,266,643 A | 11/1993 | Mustonen et al. |
| 5,272,236 A | 12/1993 | Lai et al. |
| 5,278,272 A | 1/1994 | Lai et al. |
| 5,284,613 A | 2/1994 | Ali et al. |
| 5,348,795 A | 9/1994 | Park |
| 5,358,792 A | 10/1994 | Mehta et al. |
| 5,373,236 A | 12/1994 | Tsui et al. |
| 5,414,027 A | 5/1995 | DeNicola, Jr. et al. |
| 5,491,019 A | 2/1996 | Kuo |
| 5,519,785 A | 5/1996 | Hara |
| 5,527,573 A | 6/1996 | Park et al. |
| 5,567,742 A | 10/1996 | Park |
| 5,605,936 A | 2/1997 | DeNicola, Jr. et al. |
| 5,616,627 A | 4/1997 | Sakurai et al. |
| 5,641,848 A | 6/1997 | Giacobbe et al. |
| 5,747,594 A | 5/1998 | deGroot et al. |
| 5,767,033 A | 6/1998 | Imuta et al. |
| 5,844,045 A | 12/1998 | Kolthammer et al. |
| 5,869,575 A | 2/1999 | Kolthammer et al. |

(Continued)

FOREIGN PATENT DOCUMENTS

| CA | 797 917 | 10/1968 |
| CA | 1 024 296 | 1/1978 |

(Continued)

OTHER PUBLICATIONS

R. A. Abramovitch, Polar Radicals in Aromatic Substitution, *Intra–Science Chemistry Reports*, pp. 211–218, 1969.

R. A. Abramovitch et al., "Reaction of Sulphonyl Azides with Unstrained Olefins". *J. Chem. Soc.*, pp. 2169–2172, 1974.

R. A. Abramovitch et al., Intramolecular Insertion of Aryl-sulfonylnitrenes into Aliphatic Side Chains, *J. Org. Chem.*, vol. 42, No. 17, pp. 2920–2926, 1977.

(Continued)

*Primary Examiner*—Nathan M. Nutter

(57) ABSTRACT

The present invention includes a blend composition comprising at least one coupled propylene polymer and at least 55 weight percent of at least one ethylene polymer, based on the total weight of the coupled propylene polymer and the ethylene polymer. The invention also includes methods for making the coupled propylene polymer and methods for making the blend composition. The present invention further includes films made from the blend composition.

10 Claims, 11 Drawing Sheets

U.S. PATENT DOCUMENTS

| | | | |
|---|---|---|---|
| 5,869,591 | A | 2/1999 | McKay et al. |
| 5,883,151 | A | 3/1999 | Raetzsch et al. |
| 5,929,129 | A | 7/1999 | Feichtinger |
| 6,054,540 | A | 4/2000 | Chaudhary et al. |
| 6,103,833 | A | 8/2000 | Hogt et al. |
| 6,143,829 | A | 11/2000 | Babb et al. |
| 6,143,854 | A | 11/2000 | Bamberger |
| 6,172,172 | B1 * | 1/2001 | Burgin et al. ............ 526/348.1 |
| 6,207,754 | B1 | 3/2001 | Yu |
| 6,211,302 | B1 | 4/2001 | Ho et al. |
| 6,277,916 | B1 | 8/2001 | Terbrueggen et al. |
| 6,417,242 | B1 | 7/2002 | Hughes et al. |
| 6,596,814 | B2 * | 7/2003 | Kim et al. ................. 525/191 |
| 6,646,056 | B2 * | 11/2003 | Zhao et al. ................ 525/243 |

FOREIGN PATENT DOCUMENTS

| | | |
|---|---|---|
| CA | 1 219 389 | 3/1987 |
| DE | 1 569 025 | 7/1970 |
| EP | 0 351 208 | 1/1990 |
| EP | 0 474 376 | 3/1992 |
| EP | 0 595 252 | 5/1994 |
| EP | 0 702 032 | 3/1996 |
| EP | 0 747 376 | 5/1996 |
| EP | 0 634 454 | 11/1997 |
| EP | 0 625 545 | 1/1998 |
| EP | 0 634 441 | 5/1998 |
| EP | 0 872 517 | 10/1998 |
| GB | 1 080 619 | 8/1967 |
| GB | 2 205 103 A | 11/1988 |
| JP | 46-31756 | 9/1971 |
| JP | 50-133248 | 10/1975 |
| JP | 51-134762 | 11/1976 |
| WO | 93/04486 | 3/1993 |
| WO | 96/07681 | 3/1996 |
| WO | 96/20247 | 7/1996 |
| WO | 97/20888 | 6/1997 |
| WO | 97/20889 | 6/1997 |
| WO | 99/10415 | 3/1999 |
| WO | 99/10424 | 3/1999 |
| WO | 99/10426 | 3/1999 |
| WO | 00/02960 | 1/2000 |
| WO | 00/02961 | 1/2000 |
| WO | 00/52091 | 9/2000 |
| WO | 00/53669 | 9/2000 |
| WO | 00/78858 | 12/2000 |
| WO | 00/78861 | 12/2000 |
| WO | 01/40374 | 6/2001 |
| WO | 01/53078 | 7/2001 |
| WO | 01/83605 | 11/2001 |

OTHER PUBLICATIONS

R. A. Abramovitch et al., Pyrolysis of Phenylaikylsulphonyl Azides and 2–phenethyl Azidofornate. Selectivity of Sulphonylnitrenes And Contrast between Sulphonyl–and Carbonyl–nitrenes, *J. Chem. Soc. Chem. Commun.*, pp. 1087–1088, 1981.

R. A. Abramovitch et al., "Reaction of Aromatic Sulfonyl Azides with Dienes", *J. Org. Chem.*, vol. 46, pp. 330–335, 1981.

H. Radusch et al., "Chemical coupling of polystyrene and polybutadiene in melt mixtures by using an organic sulfonylazide", *Die Angewandte Makromolekulare Chemie*, vol. 204, pp. 177–189, 1993.

N. Takashima et al., "The Processings of Crosslinked Plastics", *Kogaku Kogyo* (*Chemical Industry*), pp. 378–383, 1969.

D. S. Breslow et al., "Thermal Reactions of Sulfonyl Azides", *J. Amer. Chem. Soc.*, vol. 91, pp. 2273–2279, 1969.

Derwent Chemical Abstract No. 1977–02552Y of JP 51–134762.

Derwent Chemical Abstract No. 1977–88691Y of JP 50–133248.

M. Xanthos, "Interfacial Agents of Multiphase Polymer systems: Recent Advances", *Polymer Engineering and Science*, vol. 28, pp. 1392–1400, 1988.

K. A. Chaffin et al., "Semicrystalline Blends of Polyethylene and Isotactic Polypropylene: Improving Mechanical Performance by Enhancing the Interfacial Structure", *Journal of Polymer Science: Part B: Polymer Physics*, vol. 38, pp. 108–121, 2000.

E. P. Moore, *Polypropylene Handbook*, pp. 15–45, 1996.

E.P. Moore, *Polypropylene Handbook*, p. 220, 1996.

E.P. Moore, *Polypropylene Handbook*, pp. 330–332, 1996.

Han Shetty, "Studies on Multilaer Film Coextrusion III. The Rheology of Blown Film Coextrusion", *Polymer Engineering and Science*, vol. 18, No. 3, pp. 187–199, 1978.

U.S. Appl. No. 09/133,576, filed Aug. 13, 1998 (43324A), Craig Silvis et al., "In–Situ Rheology Modification of Polyolefins".

U.S. Appl. No. 10/121,985, filed Apr. 12, 2002 (60329A), Li–Min Tau et al., "Composition and Films Thereof".

U.S. Appl. No. 09/848,933, filed May 4, 2001 (60365A), Marlin E. Walters et al., "Molecular Melt and Methods for Making and Using the Molecular Melt".

U.S. Appl. No. 10/285,920, filed Nov. 1, 2002 (60365D), Malcolm F. Finlayson et al., "Molecular Melt and Methods for Making and Using the Molecular Melt".

U.S. Appl. No. 10/021,774, filed Dec. 12, 2001 (60487B), Johan A. Thoen et al., "Propylene Copolymer Foams".

* cited by examiner

POLYETHYLENE RICH/POLYPROPYLENE BLENDS AND THEIR USES

This appln. is a 371 of PCT/US01/17119 May 25, 2001 which claims benefet of U.S. provisional No. 60/207,511 May 26, 2000 which claims benefet of U.S. provisional No. 60/208,507 May 31, 2000 which claims benefet of U.S. provisional No. 60/246,303, Nov. 6, 2000 which claims benefet of U.S. provisional No. 60/257,514, Dec 22, 2000.

FIELD OF THE INVENTION

This invention relates to a polymer blend and articles made therefrom, including film structures made therefrom. More particularly, this invention relates to blends of a majority portion of polyethylene and a minority portion of coupled polypropylene.

BACKGROUND

Plastic films with improved properties are constantly demanded by industry. For example, in order to save costs and decrease the amount of material that must be recycled or put in a landfill, downguaged (that is thinner) films are desired. Successful downguaging requires the use of a resin with a relatively high modulus to accommodate the gauge reduction without a significant loss of productivity in converting operations and customer acceptability. As used herein, "modulus" refers to the stiffness of the film which is indicated by the 2% secant modulus as measured by ASTM D 882. Likewise, film manufacturers desire resins that can run at high production rates. Such resins require relatively high melt strength to provide web or bubble stability prior to quenching. Furthermore, many applications require the film to have good toughness (that is, high Elmendorf tear strength, dart impact and/or puncture values). In addition, for shrink film applications, the film should have a high degree of shrink (40–80%) in the machine direction and positive shrink (10–30%) in the cross direction.

Blown films are typically fabricated from ethylene polymers (also known as polyethylene (PE)). Different classes of ethylene polymers provide different film properties. Generally, selecting optimum performance is a matter of trading off one property against another, for example, increasing modulus decreases toughness. For instance, linear low density polyethylenes (LLDPE) provide good toughness and other desirable properties but these properties decrease as the modulus (modulus is proportional to density for polyethylenes) of the LLDPE increases. As such, the relatively low modulus of LLDPE limits the possibilities of downguaging the film. Moreover, LLDPE can be difficult to process at high rates, especially when run neat, due to insufficient melt strength. Also, LLDPE films generally have little cross directional shrinkage in conventional blown films. While the addition of low density polyethylene (LDPE) to the LLDPE provides improved processability (by increasing melt strength) and cross directional shrinkage, the presence of the LDPE can diminish the physical properties of the LLDPE. LDPE resins provide better processability, but generally compromise other properties, such as toughness, and do not enhance modulus. This reduced toughness limits the possibility of downguaging the film.

High molecular weight (for example, MI<0.1) polyethylene (HMWPE), which is typically a high density (>0.945 g/cc) polymer, exhibits high melt strength and high modulus in blown films. However, such a high melt strength HMWPE typically produces a film with very low tear resistance. While the impact strength of these HMWPE films can be improved via specific processing conditions, such as using a high blow-up ratio, the tear resistance remains poor. Blending LLDPE is often practiced to enhance sealability and tear resistance of HMW HDPE, but practically, such blends are limited to minor amounts of LLDPE. Conversely, HMW HDPE is sometimes blended into LLDPE films to improve creep resistance, but the melt blending quality and resultant melt orientation properties of the blend on LLDPE blown film equipment can be challenging.

In contrast to polyethylene resins, polypropylene (PP) resins have a relatively high modulus. However, PP resins have poor processability due to low melt strength and also have poor film toughness properties. Additionally, polypropylene and polyethylene are immiscible and, as such, are generally considered to be incompatible with each other for film forming. The compatibility of PP resins and PE resins can be improved somewhat by using PP impact copolymers (ICP) as the PP resin. However, even ICPs are not fully miscible with PE resins. This inherent incompatibility would be expected to severely limit the physical properties of a blend of PE and PP. Moreover, an ICP resin generally does not have substantially improved melt strength over other PP resins.

Therefore, a resin is still needed that provides the good processability of LDPE and the high modulus of a PP resin while delivering the desirable physical properties of an LLDPE resin. Surprisingly, the applicants have found that blending a minor proportion of a rheology modified (also known as "coupled") PP resin into a major proportion of an LLDPE resin yields a film with a high modulus and which also maintains good toughness.

SUMMARY OF THE INVENTION

The present invention includes a blend composition comprising (a) at least one coupled propylene polymer coupled by reaction with a coupling amount of a coupling agent, preferably a poly(sulfonyl azide). Preferably, the propylene polymer is coupled with a sufficient amount of coupling agent to increase the melt strength of the coupled propylene polymer to at least 1.5, preferably at least 2.0, more preferably at least 3, in some instances at least 11, times that of the propylene polymer before coupling; and (b) greater than 55 weight percent, more preferably at least 60 weight percent, based on the combined weight of components (a) and (b), of at least one ethylene polymer. The ethylene polymer is preferably nonelastomeric (that is, not an elastomer). Preferably, the ethylene polymer(s) used in the invention are at least partially made using Ziegler-Natta catalyst. The invention also includes films made from the composition and the process of making such a film, preferably a blown film. Particular embodiments include heat shrinkable films, institutional liner, consumer liner, heavy duty shipping sack, produce bag, batch inclusion bag, pouch, grocery bag, merchandise bag, packaging, cereal liner, soft paper overwrap, multi-wall bag, lamination or combination thereof, including multiwall or multilayer configurations thereof. Other embodiments include molded or cast articles made from such a blend.

In one aspect of the invention: (i) the modulus of a film made from the blend composition is higher than the modulus of a film made from component (b) above; and (ii) a film made from the blend composition has greater film toughness properties, compared with a film formed in approximately the same manner from a comparable ethylene polymer resin having a 2% secant modulus equivalent to the blend composition and having the same comonomer as the ethylene polymer of (b), of at least one of: tear resistance in either the machine direction (MD) or cross direction (CD) as measured by the Elmendorf Tear method (ASTM D-1922); dart impact strength as measured by the procedure of ASTM D-1709 or a modified method thereof in which the height from which the dart is dropped is decreased from 26" to 10.5" (0.66 m to 0.27 m); or puncture resistance. To be comparable, an ethylene polymer should have approximately the same melt index as the ethylene polymer of the blend. Typically, the melt index of the comparable ethylene polymer should be within 25% of the melt index of the ethylene polymer of the blend. Additionally, to be directly comparable, the comparable ethylene polymer should be made by a similar type of catalyst and similar process as the ethylene polymer of the blend.

In a second aspect of the invention, component (b) above is comprised of more than one ethylene polymer and: (i) the modulus of a film made from the blend composition is higher than the modulus of a film made from component (b) above; and (ii) a film made from the blend composition has greater film toughness properties, compared with a film formed in approximately the same manner from a comparable ethylene polymer resin having a 2% secant modulus equivalent to the blend composition and having the same comonomer as the ethylene polymer that makes up the majority of component (b), of at least one of: (1) tear resistance in either the machine direction (MD) or cross direction (CD) as measured by Elmendorf Tear method (ASTM D-1922); (2) dart impact strength as measured by the procedure of ASTM D-1709 or a modified method thereof in which the height from which the dart is dropped is decreased from 26" to 10.5" (0.66 m to 0.27 m); or (3) puncture resistance.

In a third aspect of the invention, component (b) above is comprised of more than one ethylene polymer and: (i) the modulus of a film made from the blend composition, in either the machine direction or cross direction, is at least 25% greater than the equivalent modulus of a film made from component (b) above, preferably at least 50% greater, more preferably at least 75% greater, and in some instances at least 100% greater than the equivalent modulus of a film made from component (b); and (ii) a blown film made from the blend composition exhibits a mechanical properties balance. Preferably, in this aspect component (a) is between 15 wt % and 40 wt % of the combined weight of (a) and (b).

In another embodiment, the present invention includes a blend composition for blown films comprising: (a) at least one propylene polymer having a melt strength of at least 20 cN, preferably at least 40 cN, most preferably at least 50 cN, and in some instances at least 60 cN; and (b) greater than 55% by weight, more preferably at least 60% by weight, based on the combined weight of component (a) and (b), of at least one ethylene polymer having a density of from 0.90–0.94 g/cm$^3$, most preferably from 0.905–0.925 g/cm$^3$ and having a melt index (as measured in accordance with ASTM D 1238, at a temperature of 190 C. under a weight of 2.16 KG) preferably of at least 0.1 g/10 min, more preferably at least 0.3 g/10 min, most preferably at least 0.5 g/10 min. In this embodiment, the blend composition exhibits a mechanical properties balance, when made into a blown film, and a 2% secant modulus of a blown film made from the blend, measured in either the cross direction or the machine direction, is at least 25% greater than the equivalent modulus of a blown film made from component (b) alone, preferably at least 50% greater, more preferably at least 75% greater and in some instances at least 100% greater than the equivalent modulus of a blown film made from component (b) alone. In this embodiment, component (a) is preferably an impact propylene copolymer that has been reacted with a bis(sulfonyl azide) coupling agent and component (b) is preferably 85% by weight or less of the blend, based on the combined weight of components (a) and (b). In this embodiment, component (b) is preferably prepared using a Ziegler-Natta type catalyst, and is preferably a copolymer of ethylene and 1-octene, 1-hexene, or 1-butene, more preferably ethylene and 1-octene or 1-hexene.

The articles made from the inventive blend have a modulus higher than articles made from the polyethylene component of the blend. More particularly, blown films made from the inventive blend advantageously have a sufficiently high modulus to permit downguaging while simultaneously having at least one film toughness property (Elmendorf tear strength, puncture resistance or dart impact strength) higher than a blown film made from a polyethylene resin (or a polyethylene blend) of equal modulus. Other benefits of the current composition include: (a) processability at least equivalent to current commercial blown film resins of equivalent modulus; (b) maintaining dimensional stability at higher temperatures than polyethylenes with an equivalent modulus; and, (c) improved blocking performance over a film made from the polyethylene component of the blend.

DETAILED DESCRIPTION OF THE INVENTION

Figure 1:
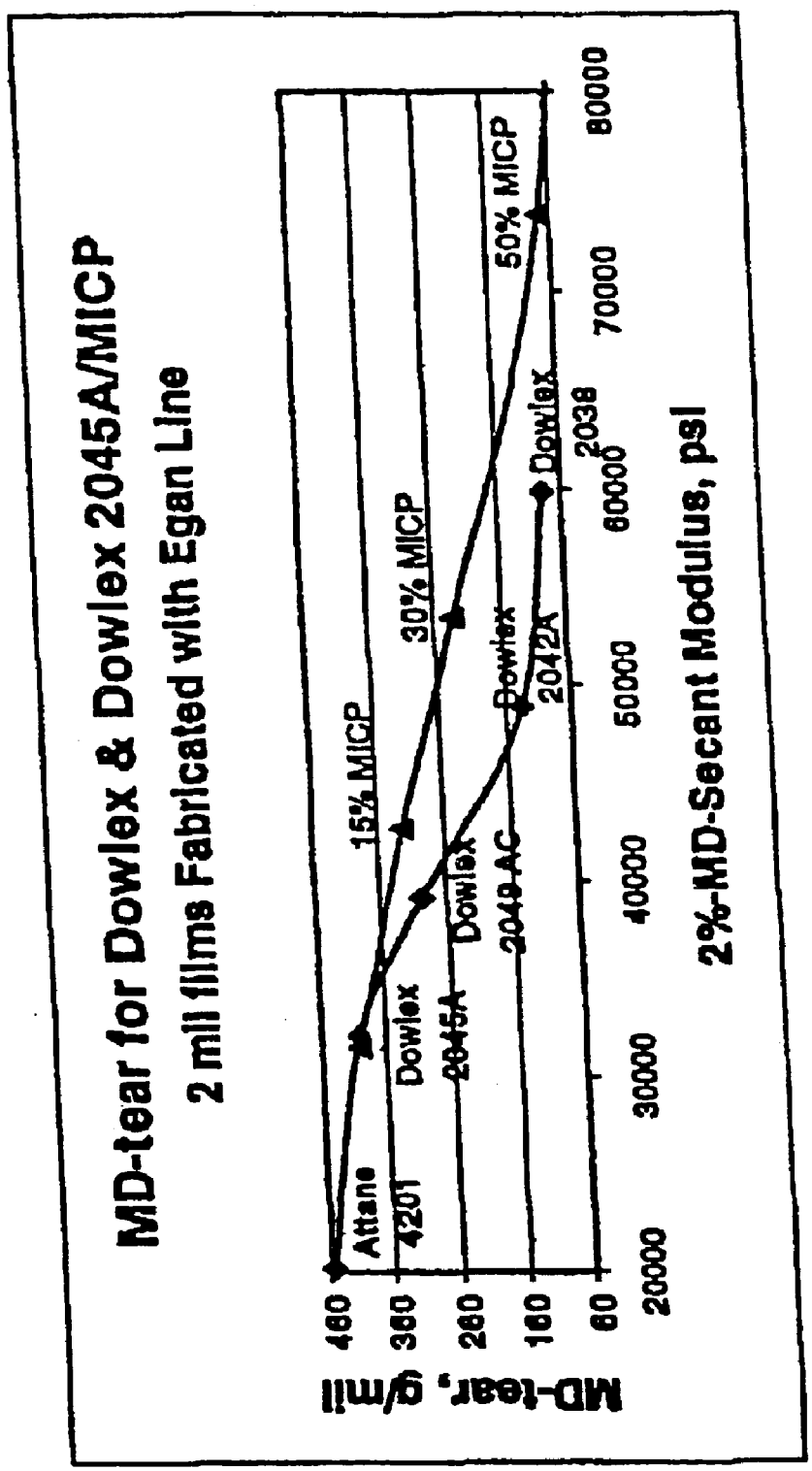
FIG. 1 shows a line graph of Elmendorf machine direction tear versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 1 had a melt index of 1.

As used herein, "coupling" refers to modifying the rheology of a polymer by reacting the polymer with a suitable coupling agent. A "coupled polymer" is a rheology modified polymer resulting from a coupling reaction. Coupled polymers are also referred to herein as "modified polymers" or "rheology modified polymers." A coupled polymer is characterized by an increase in melt strength of at least 50%, preferably at least 100% and a decrease in melt flow rate (MFR), compared to the polymer before coupling. A coupled polymer differs from a crosslinked polymer in that the coupled polymer is thermoplastic and has a low gel level. In contrast, crosslinking (otherwise known as "vulcanization") results in a thermoset polymer characterized by high gel levels.

Crosslinking is typically evidenced by gel formation which is measured in the case of polypropylene by xylene insolubility, or in the case of films by optically evident gels in a film, for instance as analyzed by a laser gel counter commercially available from Optical Control System, Inc. under the trade designation FS-3

The term "a coupling amount" of a coupling agent, such as poly(sulfonyl azide), is used herein to designate that amount of coupling agent effective to result in a measurable increase in melt strength of the polymer it reacts with such that the desired or predetermined amount of modification is realized.

The term "melt strength" refers to the strength of the polymer measured in centiNewtons at 190 C. according to the procedure described below in the Examples.

The term "mechanical properties balance" is used to mean good toughness as measured by Elmendorf tear strength equal to or greater than 50 g/mil in machine direction (MD) and 100 g/mil in cross direction (CD); together with 2% secant modulus, in either the cross direction or machine direction equal to or greater than 40,000 psi; and with puncture resistance equal to or greater than 100 ft-lb/in$^3$. Two (2) mil thick films are utilized when determining whether a blend produces a film having a mechanical properties balance.

A propylene polymer (also called polypropylene) is any polymer comprising greater than sixty five (65) weight percent —CHCH$_3$CH$_2$— repeating units as derived from a propylene monomer. Propylene polymers include propylene homopolymer as well as random and impact copolymers of propylene. Such polymers include terpolymers, tetrapolymers and higher order polymers of ethylene, propylene and other olefins, optionally dienes and other polymers.

An ethylene polymer (also called polyethylene) is any polymer comprising greater than fifty weight percent —CH$_2$CH$_2$— repeating units as derived from an ethylene monomer. Ethylene polymers include homopolymers of ethylene as well as random and block copolymers of ethylene. Such polymers include terpolymers, tetrapolymers and higher order polymers of ethylene, propylene and other olefins optionally dienes and other polymers.

The term "temperature profile" is used herein to mean a series of temperatures to which the polymer is exposed.

Propylene Polymers

Propylene polymers usable in this invention may be either homopolymers or copolymers (random or impact), preferably impact copolymers. The propylene is suitably copolymerized with one or more monomers copolymerizable therewith, but preferably with at least one other olefin or alpha olefin. Olefins include ethylene and alpha olefins, which include propylene, 1-butene, 1-pentene, 1-hexene, 1-octene, 1-nonene, 1-decene, 1-unidecene, 1-dodecene, as well as 4-methyl-1-pentene, 4-methyl-1-hexene, 5-methyl-1-hexene, vinylcyclohexane, styrene. Preferred olefins and alpha olefins for copolymerization with propylene include ethylene, 1-butene, and other higher alpha olefins, that is alpha olefins having at least 3 to 20 carbon atoms, more preferably ethylene or butylene, and higher alpha olefins, most preferably ethylene. The comonomers, or combination of comonomers, are used in any relative quantities within the definitions of the polymers. For propylene polymers, the comonomer content is preferably less than 35, more preferably 2–30, most preferably 5–20 weight percent.

The propylene polymers are preferably isotactic or syndiotactic, more preferably isotactic, most preferably having an isotacticity as measured by C$^{13}$ NMR of at least 50 percent.

The coupled propylene polymer melt flow rate is measured by ASTM D1238L at 230° C./2.16 kg. The melt flow rate of the coupled propylene polymer is preferably at least 0.1, more preferably at least 0.2, most preferably at least 0.3 g/10 min. typically up to 20, preferably up to 10, more preferably up to 4, most preferably up to 0.95 g/10 min. in order to achieve good processability and mechanical properties balance. One recognizes good processability by high output rates (>6 pounds per hour per inch of die circumference).

The polymer starting materials are suitably of any molecular weight distribution (MWD). MWD is calculated as the ratio $M_w/M_n$, where $M_w$ is the weight average molecular weight and $M_n$ is the number average molecular weight. Those skilled in the art are aware that polymers having a MWD less than 3 are conveniently made using a metallocene or constrained geometry catalyst (especially in the case of ethylene polymers) or using electron donor compounds with Ziegler Natta catalysts (especially in the case of polypropylene). In the practice of the invention, the MWD is preferably at least 2 and more preferably up to 8, most preferably up to 5.

The propylene polymer is advantageously a homopolymer for purposes of ready availability of starting material and resulting competitive pricing. However, polypropylene and polyethylene are immiscible and therefore incompatible in blends. Random and impact copolymers are preferred for compatibility of propylene and ethylene polymers. Higher compatibility results in improved physical and mechanical properties for the resulting articles (such as improved tear, dart impact, or puncture resistance in films) as compared with the base polypropylene resin of the copolymers. Impact copolymers are more preferred, again, because they are relatively compatible with ethylene copolymers. Random copolymers are advantageous when film optical properties (that is clarity and haze) are important.

Impact propylene copolymers are commercially available and are well within the skill in the art, for instance, as described by E. P. Moore, Jr in *Polypropylene Handbook*, Hanser Publishers, 1996, page 220 and U.S. Pat. Nos. 3,893,989 and 4,113,802. The term "impact copolymer" is used herein to refer to heterophasic propylene copolymers where polypropylene is the continuous phase and an elastomeric phase is uniformly dispersed therein. The impact copolymers result from an in-reactor process rather than physical blending. Usually the impact copolymers are formed in a dual or multi-stage process, which optionally involves a single reactor with at least two process stages taking place therein, or optionally multiple reactors. Advantageously, the impact copolymers have at least 5 weight percent, preferably at least 6, most preferably at least 7, preferably up to 35, more preferably up to 15 weight percent, and most preferably up to 9 weight percent ethylene comonomer. Illustrative impact copolymer propylene polymers include those commercially available from The Dow Chemical Company under the trade designations INSPiRE C104-01, INSPiRE C105-02, DC111 and INSPiRE C107-04, propylene impact copolymers having melt flow rates of 1, 2, 0.8 and 4 g/10 min, respectively, under a weight of 2.16 kg at a temperature of 230° C. and flexural (flex) modulus as measured according to the procedures of ASTM D 790A of 180,000, 140,000, 166,800 and 170,000 psi (1,241,056; 965,266; 1,150,000 and 1,172,109 kPa, respectively).

Coupling Agents

The propylene polymer resin is reacted with a polyfunctional compound capable of insertion reactions into C—H bonds. Such polyfunctional compounds have at least two, preferably 2, functional groups capable forming reactive groups which are capable of C—H insertion reactions. Those skilled in the art are familiar with C—H insertion reactions and reactive groups capable of such reactions. For instance, carbenes as generated from diazo compounds, as cited in Mathur, N. C.; Snow, M. S.; Young, K. M., and Pincock, J. A.; *Tetrahedron*, (1985),41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two functional groups capable of forming reactive groups which are capable of C—H insertion under reaction conditions are referred to herein as "coupling agents". Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides (R$_2$—P(O)—$N_3$)and silyl azides (R$_3$—Si—$N_3$). Preferably, the coupling agent is a poly(sulfonyl azide). U.S. patent application Ser. No. 09/133,576 filed Aug. 13, 1998 and WO 99/10424 published Mar. 4, 1999 (which are both incorporated by reference herein in their entirety) contain additional teaching regarding azides and their use for modifying polymers.

When the poly(sulfonyl azide) reacts with the propylene polymer resin, at least two separate propylene polymer chains are advantageously joined and the molecular weight of the polymer chain is increased. In the preferred case when the poly(sulfonyl azide) is a bis(sulfonyl azide) (hereinafter "BSA"), two propylene polymer chains are advantageously joined. When the coupling agent reacts with an impact copolymer, it is believed the coupling agent will at least partially couple propylene polymer chains of the continuous phase to ethylene polymer chains of the elastomeric phase, thereby forming a compatibilizer, which it is believed will improve the compatibility of the polymers of the blend for each other and for the polyethylene.

The poly(sulfonyl azide) is any compound having at least two sulfonyl azide groups (—$SO_2N_3$) reactive with the propylene polymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than 50, more preferably less than 20, most preferably less than 15 carbon, oxygen or silicon atoms. Silicon containing groups include silanes and siloxanes, preferably siloxanes. The term inertly substituted refers to substitution with atoms or groups which do not undesirably interfere, at the coupling reaction conditions, with the desired reaction(s) or desired properties of the resulting coupled polymers. Such groups include fluorine, aliphatic or aromatic ether, siloxane as well as sulfonyl azide groups when more than two propylene polymer chains are to be joined. R is suitably aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl) azides include such compounds as 1,5-pentane bis (sulfonylazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis (sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

The subject matter of this invention is not dependent on the reaction mechanisms. The following discussion regarding the coupling reaction mechanism provides the inventors current theories but is not intended to limit the scope of this invention. Sulfonyl azides decompose in several ways, but for the practice of the invention, the reactive species, believed to be the singlet nitrene, as evidenced by insertion into C—H bonds is desired. Thermal decomposition is reported to give an intermediate singlet sulfonyl nitrene, which will react readily by insertion into carbon-hydrogen bonds. The high temperatures necessary for efficient formation of the sulfonyl nitrene is usually greater than 150° C. When BSA such as, 4,4'-Oxydibenzenesulfonyl azide (DPO-BSA) is used for the coupling agent, polymer stream temperatures of greater than 250° C. are preferably avoided while there is significant unreacted azide in the reaction mixture.

The poly(sulfonyl azide) is preferably mixed with the propylene polymer before the resulting mixture is heated to the decomposition temperature of the poly(sulfonyl azide). By decomposition temperature of the poly(sulfonyl azide) is meant that temperature at which a substantial percentage of the azide is converted to the sulfonyl nitrene, eliminating nitrogen and more heat in the process. The decomposition temperature may be determined by differential scanning calorimetry (DSC). For instance, a differential scanning calorimeter (DSC) thermogram of the DPO-BSA shows no change in the heat flow until a sharp endothermic melting peak is observed at 100° C. The baseline is flat again (no heat flow) until a broad exothermic peak is observed that begins 150° C., peaks at 185° C. (referred to herein as the peak decomposition temperature) and is complete by 210° C. The total amount of energy released due to decomposition of the sulfonyl azide groups is 1500 Joules/gram. Preferably, the poly(sulfonyl azide) is heated to at least the peak decomposition temperature. The poly(sulfonyl azides) used advantageously have a peak decomposition temperature greater than 150° C., preferably greater than 160° C., more preferably greater than 180° C.

Those skilled in the art recognize that the poly(sulfonyl) azide, the reactivity of the azide, and the desired or predetermined amount of chain coupling determine the amount of poly(sulfonyl)azide to be used. In the compositions of the invention, the amount of coupling desirable is optionally determined from the desired melt strength in the coupled propylene polymer. The melt strength of the coupled propylene polymer is advantageously sufficient for the ethylene polymer/propylene polymer blend to form and maintain a sufficiently stable bubble on film blowing equipment to run at commercial output rates (greater than 6 lb/hr/in of die circumference ). For blow molding and thermoforming applications, the melt strength of the coupled propylene polymer is advantageously sufficient to minimize excessive sag in the article being formed. For extrusion coating application, the melt strength of the coupled propylene polymer is advantageously sufficient to minimize neck-in of the polymer blend exiting the die.

Preferably, the melt strength of the coupled propylene polymer is at least 5 cN, more preferably at least 10 cN. To avoid blown film bubble instabilities, the melt strength is preferably up to 100 cN, more preferably up to 75 cN. Determining the amount of poly(sulfonyl azide) that gives this result is within the skill in the art. The amount is preferably at least 50 parts per million by weight (ppm), more preferably at least 75 ppm, most preferably at least 100 ppm, and in some instances, preferably at least 150 ppm. In the practice of the invention, formation of crosslinked networks to an extent that would result in intractable propylene polymer is to be avoided; therefore, poly(sulfonyl azide) is preferably limited to that amount which results in chain coupled or rheology modified (but not substantially crosslinked) propylene polymer, preferably less than 1000 ppm, more preferably less than 600 ppm, most preferably less than 500 ppm poly(sulfonyl azide) based on the total weight of propylene polymer or polypropylene/ethylene impact copolymer. Substantial crosslinking is characterized by the presence of gels of sufficient size or weight percentage such that the processing of the film is detrimentally affected. Such detrimental effects include increased operating amperage, discontinuities in or undispersed materials in the film, increased back pressure, and/or, partial die plugging due to gels or black specs.

For film applications, the melt flow rate (measured in accordance with ASTM D 1238, at a temperature of 230 C. under a weight of 2.16 KG) of the coupled propylene polymer is preferably at least 0.1 g/10 min, more preferably at least 0.15 g/10 min, most preferably at least 0.2 g/10 min. For film applications, the melt flow rate of the coupled propylene polymer is preferably 10 g/10 min or less, more preferably 4 g/10 min or less, most preferably 2 g/10 min or less. For blown film applications, the melt flow rate of the coupled propylene polymer is even more preferably 1 g/10 min or less.

Preparation of Modified Polypropylene

The propylene polymer(s) and coupling agent are suitably combined in any manner which results in desired reaction thereof, preferably by mixing the coupling agent with the polymer under conditions which allow sufficient mixing before or during reaction to avoid unnecessary or undesirably uneven amounts of localized reaction. An undesirable amount is an amount which interferes with the purpose of the final product. In a preferred embodiment the process of the present invention takes place in a single vessel, that is mixing of the coupling agent and polymer takes place in the same vessel as heating to the decomposition temperature of the coupling agent. The vessel is most preferably a twin-screw extruder, but preferably a single-screw extruder or advantageously a melt mixer, including a batch mixer. The reaction vessel more preferably has at least two zones of different temperatures into which a reaction mixture would pass.

In the most preferred embodiment, the propylene polymer and the coupling agent are physically mixed at a temperature which is low enough to minimize the reaction between the coupling agent and the polymer. Such physical mixing can occur in any equipment, such as V-blenders, ribbon or paddle blenders, tumbling drums, or extruders, which will mix the coupling agent and the propylene polymer. The term extruder is used for its broadest meaning to include such devices as a device which extrudes pellets as well as an extruder which produces the extrudate for forming into articles, such as a film.

Preferably, this physical mixing occurs in the early stages of an extruder, most preferably a twin screw extruder. In particular, this embodiment may be practiced by simultaneously introducing the propylene polymer resin and the coupling agent into the feed section of an extruder. The extruder is configured to have a first section that physically mixes and conveys the coupling agent and polymer in a manner that minimizes the reaction between the coupling agent and the polymer. The conveying first section is followed by at least a second section where the coupling agent and polymer are rapidly further mixed and sufficient heat is added to cause significant reaction between the coupling agent and polymer.

In another embodiment, the mixing is preferably attained with the polymer in a molten or at least partially melted state, that is, above the softening temperature of the polymer, or in a dissolved or finely dispersed condition rather than in a solid mass or particulate form. Any mixing equipment is suitably used in this embodiment, preferably equipment which provides sufficient mixing and temperature control in the same equipment, but advantageously practice of this embodiment takes place in such devices as an extruder, melt mixer, pump conveyor or a polymer mixing devise such as a Brabender melt mixer. While it is within the scope of this embodiment that the reaction take place in a solvent or other medium, it is preferred that the reaction be in a bulk phase to avoid later steps for removal of the solvent or other medium.

Melt phase mixing is advantageous for forming a substantially uniform admixture of coupling agent and polymer before exposure to conditions in which chain coupling takes place. Conveniently for this embodiment, the formation of a substantially uniform admixture occurs along a temperature profile within equipment such as an extruder. The first zone is advantageously at a temperature at least the softening temperature of the polymer(s) and preferably less than the decomposition temperature of the coupling agents and the second zone being at a temperature sufficient for decomposition of the coupling agent. Especially in the case of propylene polymers, most preferably the propylene polymer(s) and coupling agent are exposed to a profile of melt stream temperatures ranging from 160° C. to 250° C.

Those skilled in the art recognize that a polymer, or mixture thereof, typically melts over a range of temperatures rather than melting sharply at one temperature. For the practice of this embodiment, it is sufficient that the polymer be in a partially melted state. For convenience, the temperature of this degree of melting can be approximated from the differential scanning calorimeter (DSC) curve of the polymer or mixture thereof to be treated.

Conveniently, when there is a melt extrusion step between production of the polymer and its use, at least one step of the process of the invention takes place in the melt extrusion step. The heat produced during the extrusion step provides the energy necessary to cause the reaction between the coupling agent and the target polymer.

For all embodiments, a temperature of at least the decomposition temperature of the coupling agent is preferably maintained for a time sufficient to result in decomposition of at least sufficient coupling agent to avoid later undesirable reaction, preferably at least 80, more preferably at least 90, most preferably at least 95 weight percent of the coupling agent is reacted. Those skilled in the art realize that this time is dependent on whether the temperature is one at which the coupling agent slowly decomposes or one at which it very rapidly decomposes. Preferably, the time will be at least 5 seconds, more preferably at least 10 seconds to avoid unreacted coupling agent, and subsequent undesirable reactions, or to avoid the need for inconveniently, possible destructively high temperatures. Conveniently, the reaction time is 20 seconds.

As discussed previously, the melt strength of the propylene polymer is advantageously increased by this coupling reaction. Preferably, the melt strength is increased to at least 1.5, more preferably 2.0, times the melt strength of the polypropylene before coupling, preferably at least sufficient to support a stable bubble at output rates of 6 lb/hr/in of die circumference (0.397 g/s/cm) at 2 mil (50 micron) gauge, most preferably at least 3 times that of the polymer before coupling and in some instances at least 11 times that of the polymer before coupling. Preferably, for film applications, the melt strength of modified propylene polymer is up to 20 times that of the polymer before coupling, more preferably 12 or less. When excessive levels of coupling agents are used, one can experience gels, poor drawability (insufficient to draw the film to gauges as low as 0.6 mils (15 microns)), tear-off at the die, and lower than desired mechanical properties, such as dart and tear strength. For some applications, such as blow molding or foaming, it may be desirable to increase the melt strength of the modified propylene polymer to greater than 20 times the melt strength of the uncoupled polypropylene.

Ethylene Polymers

Either ethylene homopolymers or copolymers, preferably copolymers, are usable in this invention. More preferably, ethylene-alpha olefin copolymers are used in the invention. The ethylene is suitably copolymerized with one or more monomers copolymerizable therewith, but preferably with at least one other olefin, more preferably an alpha olefin having from 3 to 20, most preferably 3 to 8, carbon atoms. Olefins include ethylene and alpha olefins, which include propylene, 1-butene, 1-pentene, 1-hexene, 1-octene, 1-nonene, 1-decene, 1-unidecene, 1-dodecene as well as 4-methyl-1-pentene, 4-methyl-1-hexene, 5-methyl-1-hexene, vinylcyclohexane, styrene. Preferred alpha olefins for copolymerization with ethylene include propylene, 1-butene, 1-pentene, 1-hexene, 1-heptene, and 1-octene, more preferably 1-butene, 1-hexene or 1-octene.

Optionally, but not in the most preferred embodiment, the ethylene polymers have comonomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, norbornene, tetracyclododecadiene, or mixtures thereof, preferably butadiene, hexadienes, and octadienes, most preferably 1,4-hexadiene, 4-methyl-1,4-hexadiene, 5-methyl-1,4-hexadiene, dicyclopentadiene, and 5-ethylidene-2-norbornene. These monomers are optionally used with ethylene alone or, preferably, with ethylene and at least one additional monomer polymerizable therewith, most preferably propylene as in the case of ethylene/propylene/diene rubber (EPDM).

The comonomers, or combination of comonomers, are used in any relative quantities within the definitions of the polymers. For ethylene polymers, the comonomer content is preferably less than 50, preferably 2–30, more preferably 5–20 weight percent.

The ethylene polymer is preferably a linear low density polyethylene (LLDPE), a homogeneously branched linear polyethylene or a substantially linear polyethylene in order to provide enhanced mechanical properties. Substantially linear polyethylene is that polyethylene such as described in U.S. Pat. Nos. 5,272,236 and 5,278,272 which are incorporated by reference herein in their entireties. Examples of a homogeneously branched linear polyethylene are polyethylenes having a CDBI greater than 50% as calculated in accordance with WO 93/04486 using the equipment and procedures as described in U. S. Pat. No. 5,008,204, such as polyethylenes available from the Exxon Chemical Company under the trade names EXCEED and EXACT. Conventional low density polyethylene formed in the high pressure process (LDPE), ethylene elastomers or plastomers and HDPE are also usable in this invention when the properties imparted by those ethylene polymers are desired. Additionally, blends of various polyethylenes may be used to improve the mechanical and physical properties of the resulting PE/PP blend. For example, a copolymer blend of a LLDPE and substantially linear polyethylene can be used to improve the resulting film toughness properties of the resulting PE/PP blend.

The ethylene polymers have a density at least 0.865, preferably at least 0.880, more preferably at least 0.900, most preferably at least 0.910 g/cm$^3$. The density of the ethylene polymers is no more than 0.962, preferably up to 0.945, more preferably up to 0.930, most preferably up to 0.925 g/cm$^3$. Ethylene polymer densities are determined as measured by ASTM D 792.

The polymer starting materials are suitably of any molecular weight distribution (MWD). MWD is calculated as the ratio $M_w/M_n$, where $M_w$ is the weight average molecular weight and $M_n$ is the number average molecular weight. Those skilled in the art are aware that polymers having a MWD less than 3 are conveniently made using a metallocene or constrained geometry catalyst (CGC) or using electron donor compounds with Ziegler Natta catalysts. In the practice of the invention, the MWD is preferably at least 2 and more preferably up to 8, most preferably up to 5. The MWD of the ethylene polymer used in the invention will be selected on the basis of the properties desired. For example, a broader MWD polymer may be chosen when good processability, particularly bubble stability in blown films, is desired. Conversely, a narrower MWD polymer may be chosen when higher tear strength or toughness is desired.

The ethylene polymers preferably have a melt index (MI) as measured by ASTM D-1238 condition 190° C./2.16 Kg (formerly known as Condition E), preferably at least 0.1 g/10 min., more preferably at least 0.3 g/10 min, most preferably at least 0.5 g/10 min. The MI is preferably less than 15, more preferably less than 10, most preferably less than 6 g/10 min. For blown film applications, the MI is even more preferably less than 3.0 g/10 min, further more preferably less than 2.0 g/10 min. For blown film applications, in a further most preferable aspect, the MI is between 0.5 g/10 min and 1.5 g/10 min, inclusive. It is believed that the high melt strength propylene resins used in the blend will tend to minimize the occurrence of melt fracture during the manufacture of a blown film and therefore allow lower MI ethylene polymers to be used.

Ethylene polymers suitable for practice of the invention include polymers such as those commercially available from The Dow Chemical Company under the trade designations DOWLEX, ATTANE, AFFINITY and ELITE polyethylenes; polymers commercially available from Exxon Chemical Corporation under the trade designations EXCEED and EXACT and polymers commercially available from Mitsui Petrochemical Industries under the trade designation TAFMER; polyethylene commercially available from Equistar, Inc. under the trade designation Petrothene GA501020 polymer; polyethylene commercially available from Nova Chemicals Corporation under the trade designation Novapol TF-0119-FP; and polyethylene commercially available from Union Carbide Corporation under the trade designations Unipol DFDA-7441 polymer or Tuflin HS-7028 polymer.

In an alternative embodiment, the polyethylene is preferably a high density polyethylene, more preferably having a density of at least 0.945 g/cm$^3$. Most preferably the density is between 0.945 and 0.962 g/cm$^3$, inclusively. The high density polyethylene preferably has a weight average molecular weight (Mw) at least 100,000 and is of the type referred to in the art as high molecular weight, high density polyethylene (HMW HDPE). More preferably the weight average molecular weight is between 150,000–300,00 inclusively. Such polyethylenes are within the skill in the art, for instance, as commercially available from Equistar, Inc. under the trade designation Alathon 5005 polymer or from The Dow Chemical Company under the trade designation High Density Polyethylene 53050E.

Additives

Additives are optionally included in compositions of the invention. Additives are well known within the skill in the art. Such additives include, for instance, stabilizers including free radical inhibitors and ultraviolet wave (UV) stabilizers, neutralizers, nucleating agents, slip agents, antiblock agents, pigments, antistatic agents, clarifiers, waxes, resins, fillers such as silica and carbon black and other additives within the skill in the art used in combination or alone. Effective amounts are known in the art and depend on parameters of the polymers in the composition and conditions to which they are exposed.

Blends

Melt or dry blending, for example at the hopper of the extruder or in an off-line tumble blending operation, is useful to achieve the blends of the invention. Preferably, the modified polypropylene is blended into the polyethylene before or during the pelletization step at the end of the polyethylene production process. Preferably, the amount of ethylene polymer is at least 55 percent, more preferably at least 60 percent, most preferably at least 65 percent, up to 90 percent, more preferably up to 85 percent of the resulting blend of coupled polypropylene and polyethylene.

Those skilled in the art will recognize that more than one ethylene polymer is optionally used, particularly when each polymer contributes a desirable characteristic to the blend or resulting film or other article. Illustrative are use of both LDPE and LLDPE, or use of both a substantially linear polyethylene and HDPE or LLDPE. The polyethylene blends may be compounded or may be an in-reactor blend. An example of in-reactor polyethylene blends that are preferably used for the polyethylene rich phase of the current PE/PP blend are disclosed in U.S. Pat. No. 5,844,045 to Kolthammer et al. and U.S. Pat. No. 5,869,575 to Kolthammer et al., both of which are incorporated herein by reference for their teaching regarding in-reactor blends.

Similarly, more than one propylene polymer is optionally included in a blend of the invention. At least one of the propylene polymers is coupled in the practice of the invention; however, coupling of one or more other polymers included in the blend is optional. Preferably, for reasons of cost, the ethylene polymer which comprises the majority of the ethylene polymer/propylene polymer blend is not coupled with a coupling agent. Furthermore, polymers other than ethylene polymers and propylene polymers are optionally included with the at least one coupled propylene polymer and at least one ethylene polymer in blends of the invention.

Forming

The compositions of the invention may be formed into useful articles by standard forming methods known in the art. Typically, the inventive compositions may be formed by blown film extrusion, cast film extrusion, or injection or blow molding, preferably blown film extrusion.

Compositions of the invention are advantageously useful in making films, especially blown films. The technique of blown film extrusion is well known for the production of thin plastic films. In an advantageous process, plastics are extruded through a circular die to form a film. Air is introduced through the center of the die to maintain the film in the form of a bubble which increases the diameter of the film 2 to 6 fold, after which the bubble is collapsed onto rollers. There are a number of variations of such a process within the skill in the art, for instance as described in such references as U.S. Pat. Nos. 3,959,425; 4,820,471, where the difference between high (referred to as "long stalk" therein) and low stalk film blowing is discussed at column 1; 5,284,613; W. D. Harris, et al in "Effects of Bubble Cooling on Performance and Properties of HMW-HDPE Film Resins", *Polymers, Laminations & Coatings Conference, Book* 1, 1990, pages 306–317; and, Moore, E. P., *Polypropylene Handbook*, Hanser, New York, 1996, pages 330–332.

The inventive composition may also be used in coextruded films. The formation of coextruded blown films is known in the art and applicable to the present invention. Articles illustrative of the art include Han and Shetty, "Studies on Multilayer Film Coextrusion III. The Rheology of Blown Film Coextrusion," *Polymer Engineering and Science*, February, (1978), vol. 18, No. 3 pages 187–199; and Morris, "Peel Strength Issues in the Blown Film Coextrusion Process," 1996 *Polymers, Laminations & Coatings Conference*, TAPPI Press, Atlanta, Ga. (1996), pages 571–577. The term "coextrusion" refers to the process of extruding two or more materials through a single die with two or more orifices arranged such that the extrudates merge together into a laminar structure, preferably before chilling or quenching.

Uses

Coextruded blown films of the present invention can be formed into pouches, bags, containers using packaging machinery within the skill in the art such as heat sealing devices using mandrels. Pouches, bags and other containers made from this combination of materials provide excellent toughness and impact strength and furthermore provide an excellent barrier to grease and oil and light hydrocarbons such as turpentine. Coextruded blown film of the present invention can be used as a packaging substrate alone, as a liner in multi-wall bags, or a strength/sealant ply in laminated structures such as with polyethylene terephthalate or biaxially oriented polypropylene.

In multilayer films each layer advantageously imparts a desired characteristic such as weatherability, heat seal, adhesion, chemical resistance, barrier layers (for example, to water or oxygen), elasticity, shrink, durability, hand and feel, noise or noise reduction, texture, embossing, decorative elements, impermeability, stiffness. Adjacent layers are optionally direct adhered, or alternatively have an adhesive, tie or other layer between them, particularly for the purpose of achieving adhesion therebetween. Constituents of the layers are selected to achieve the desired purpose.

Films made of the blend compositions of this invention advantageously have greater resistance to tear and puncture than films of the same gauge made by the same process but from an ethylene polymer of the same modulus and having the same comonomer, if any, as utilized in the ethylene polymer of the blend. Preferably, film of the invention have a 2% secant modulus as measured by ASTM D-882 in either the machine direction or cross direction of 40,000 psi. When ethylene/1-octene copolymers are used for the polyethylene phase, the film of the invention preferably have a 2% secant modulus as measured by ASTM D-882 in either the machine direction or cross direction of 50,000 psi. Preferably, films of the invention have a machine direction tear resistance (MD tear) as measured according to the procedures of ASTM D1922 of at least 50 g/mil (2 g/micron) preferably at least 75 g/mil (3 g/micron), and a cross directional tear resistance (CD tear) as measured according to the procedures of ASTM D1922 of at least 100 g/mil (4 g/micron) preferably at least 150 g/mil (6 g/micron).

Films comprising the coupled propylene polymer/ethylene polymer blend according to the current invention have surprisingly been found to have better anti-blocking characteristics than films made with the ethylene polymer alone.

Films made of the compositions of this invention advantageously have dimensional stability up to at least 140 C. which is higher than typical polyethylene shrink films. This dimensional stability is important for higher temperature service, hot fill, cook-in, sterilization, etc. These inventive films are advantageously used to make heat shrink films. Characteristics useful in these heat shrink films are good tear, dart impact strength, puncture strength, and high modulus. The term "good" is used to indicate tear above 50 g/mil in the MD- and 100 g/mil in the CD-direction and an impact strength above 30 g/mil as measured by the procedure of ASTM 1922 and ASTM D1709 condition A, respectively. The term "high modulus" is used to mean 2% secant modulus as measured by ASTM D 882 of at least 40,000 psi (275,790 kPa).

Surprisingly, the inventive films do not need to be stretched or post-oriented in order to provide a biaxial heat shrink. For example, films fabricated according to the standard blown film process, with blow-up-ratios of 1.5–3:5, exhibit high shrinkage in the machine direction and sufficient shrinkage in the cross direction (10–30%) to provide good packages with very few wrinkles and an excellent bullseye at the end of the package. In contrast, the biaxial heat-shrink response of an oriented polyolefin film is generally obtained by initially stretching fabricated film to an extent several times its original dimensions in both the machine and transverse directions to orient the film. The stretching is usually accomplished while the fabricated film is sufficiently soft or molten, although cold drawn shrink films are also known in the art. After the fabricated film is stretched and while still in a stretched condition, the stretch orientation is frozen or set in by quick quenching of the film.

The present invention also includes, but is not limited to, use of the films of the invention in such applications as wrapping and containing industrial products, consumer goods, books, mail, food packages and heavy items such as shingles, bricks, decorative rocks and industrial parts. Other uses may include consumer liners, heavy duty shipping sacks, produce bags, batch inclusion bags, pouches, grocery bags, merchandise bags, bags for foam packaging (especially where the foam is formed in the bag), cereal liners, soft paper overwrap, multi-wall bags, and laminations.

Further applications of the present inventive composition include use in fabricating molded articles.

EXAMPLES

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention. For the examples below, unless otherwise indicated: melt flow rate (MFR) is measured in accordance with ASTM D 1238, at a temperature of 230 C. under a weight of 2.16 KG; melt index (MI) is measured in accordance with ASTM D 1238, at a temperature of 190 C. under a weight of 2.16 Kg; Dart impact is measured in accordance with ASTM D-1709 (method A); Elmendorf tear is measured in accordance with ASTM D-1922 (type B); and Secant modulus is measured in accordance with ASTM D-882;.

Melt strength was measured by using a capillary rheometer fitted with a 2.1 mm diameter, 20:1 die with an entrance angle of approximately 45 degrees. After equilibrating the samples at 190° C. for 10 minutes, the piston was run at a speed of 1 inch/minute. The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as the melt strength.

Film puncture values are obtained using an Instron tensiometer equipped with a strain cell and an integrated digital display that provides force determinations. A single ply of a blown monolayer film having a thickness of 2 mils (0.051 mm) is mounted taut between the two halves of a circular holder constructed of aluminum and machined to couple the halves securely when they are joined together. The exposed film area when mounted in the holder is 4 inches (10.2 cm) in diameter. The holder is then affixed to the upper stationary jaw of the tensiometer. To the lower jaw of the tensiometer which is set to traverse upwardly, a hemispherical aluminum probe having a 12.5 mm diameter is affixed. The probe is aligned to traverse upwards through the center of the mounted film at a deformation rate of 250 mm/min. The force required to rupture the film is taken from the digital display and divided by the film thickness and the diameter of the probe to provide puncture resistance (sometimes referred to as "puncture") in kg-cm/cc or ft-lb/in$^3$.

Figure 7:
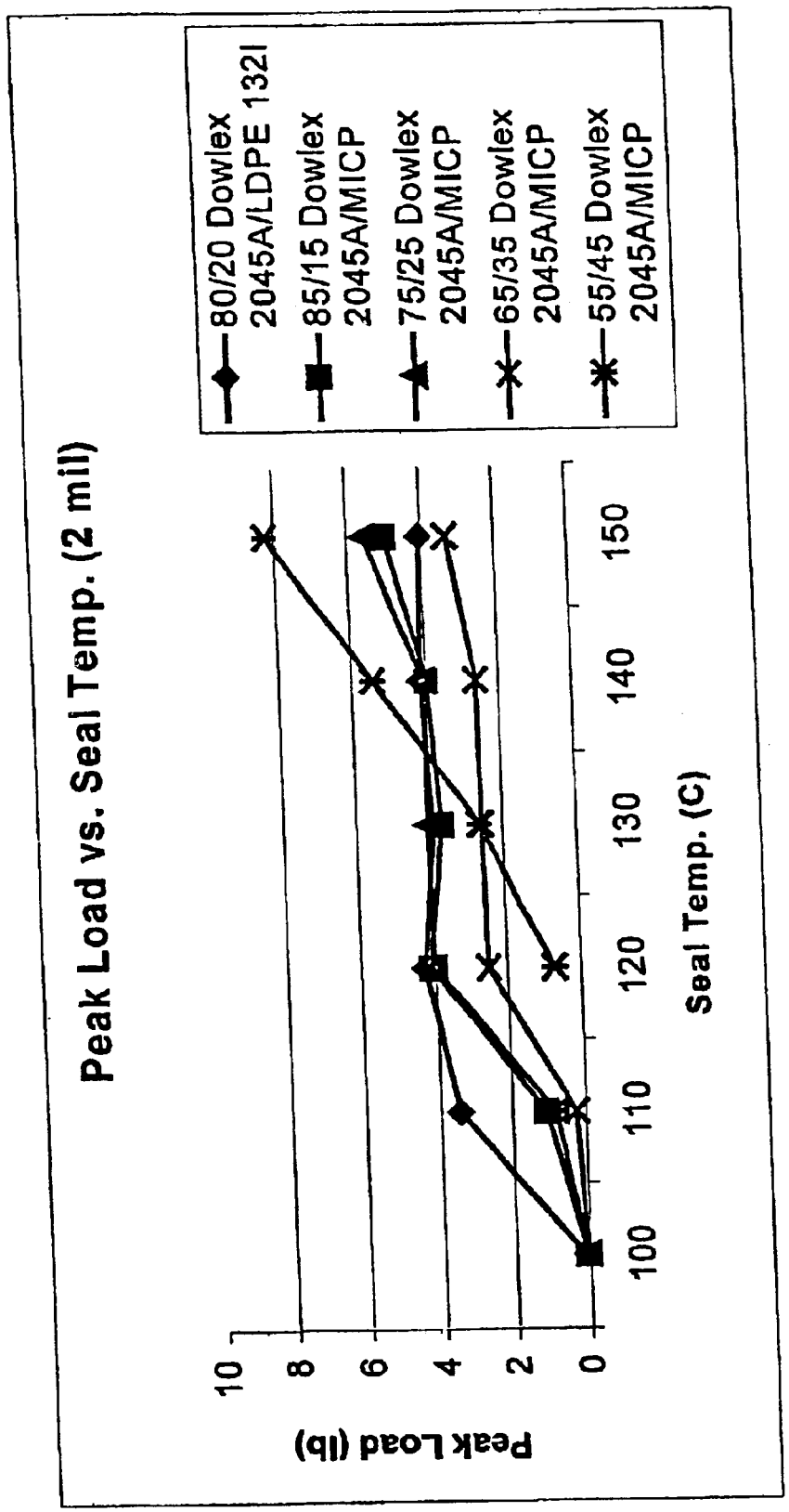
FIG. 7 is a graph of peak load (seal strength) versus seal temperature for films made from blends of ethylene/1-octene LLDPE/LDPE and blends of ethylene/1-octene LLDPE/modified impact copolymer PP.
Figure 8:
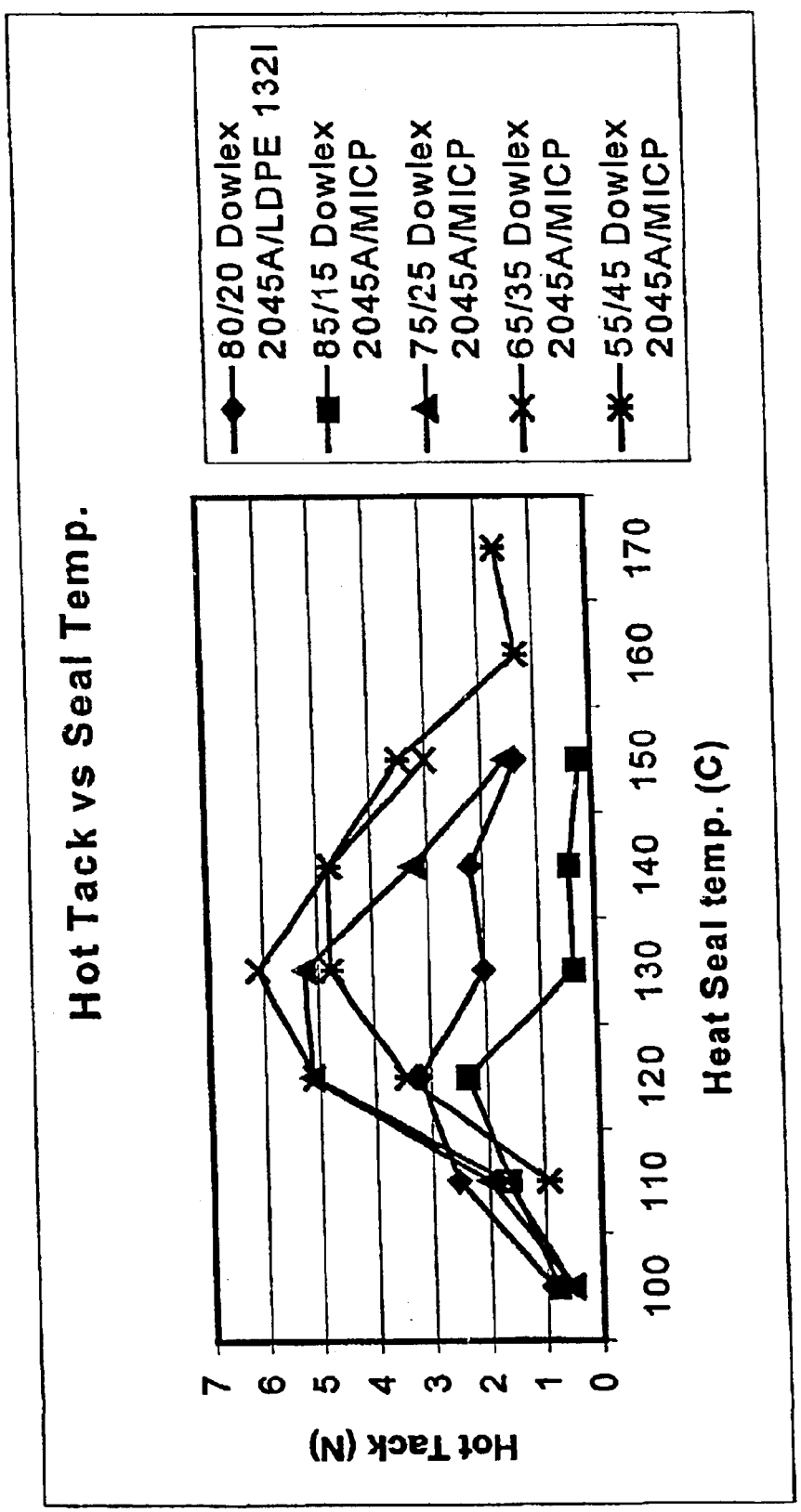
FIG. 8 is a graph of hot tack strength versus seal temperature for films made from blends of ethylene/1-octene LLDPE/LDPE and blends of ethyelene/1-octene LLDPE/modified impact copolymer PP.

Heat seal initiation temperature is defined as the minimum temperature for a 2 lb/in (0.4 kg/cm) seal strength. Heat seal testing is performed using 2 mil (50 micron) thick extruded monolayer films made from the polymer blends described in FIG. 7. The seals tested for the data of FIGS. 7 and 8 are one (1) inch long. The testing is done on a Hot Tack Tester, available from Topwave Corporation, using a 0.5 second dwell time with a 40 psi (0.28 MPa) seal bar pressure. The seals are made at 10° increments in the range of 100–150° C. by folding the film structures over and sealing the film to itself. As discussed earlier, the seals are one (1) inch long. The so-formed seals are pulled 24 hours after they are made using an Instron tensiometer at a 10 in/min. (51 cm/min.) crosshead rate. The peak load is the maximum load (lb force seal strength) measured for a given sealing temperature. Since the seals tested are one inch long, the seal strength values listed in FIG. 7 in lb force (lb) are equivalent to lb/inch.

Hot tack initiation temperature is defined as the minimum seal temperature required to develop a one (1) Newton/in Hot Tack strength. Hot tack testing is also performed using above-described film structures and a Topwave Hot Tack Tester set at a 0.5 second dwell, 0.2 second delay time, and 40 psi (0.28 NPa) seal bar pressure. Hot tack seals are made at 10° increments in the temperature range of 100–170° C. by folding the film structure over and hot tack sealing it to itself. As discussed earlier, the seals tested are one (1) inch long. The peel rate applied to the so-formed hot tack seals is of 150 mm/sec. The tester pulls the seal immediately after the 0.2 second delay. Hot tack strength is the maximum strength measured for a given seal temperature. Ultimate hot tack strength is taken as the -maximum force in newtons (N) achieved in the 100–170° C. temperature range for the films of FIG. 8. Since the seals tested are one inch long, the hot tack values listed in FIG. 8 in newtons (N) are equivalent to N/inch.

Resistance to Stretch (% strain) was measured using the procedures of ASTM D 882 (2% Secant) with the following exceptions to the procedure: (a) a crosshead speed of 20 mm/min. as opposed to the 25 mm/min set forth in the procedure; (b) a grip distance of 4 inches as opposed to the 10 inches set forth in the procedure; and (c) sample elongation of 10% as opposed to the 2% set forth in the procedure. For all samples, the % strain was calculated for a specified force of 9 MPa.

Base Polypropylene Resin

The base polypropylene used to make a modified impact copolymer polypropylene (hereinafter "MICP") used in all the following examples is isotactic polypropylene pellets, available from The Dow Chemical Company under the designation DC111. DC111 is an impact copolymer of propylene with 7–9 weight percent of repeating units derived from ethylene, melt flow rate (MFR)=0.68 g/10 min and melt strength of approximately 12 cN.

Preparation of DPO-BSA Coupling Agent 4,4'-Oxydibenzenesulfonyl azide (hereinafter in the examples referred to as "DPO-BSA" or the "DPO-BSA coupling agent") used for the experiments of FIGS. 1 through 4 is prepared by the reaction of sodium azide with the corresponding bis(sulfonyl chloride) which is commercially available. An aqueous solution of sodium azide is added to an acetone solution of the bis(sulfonyl chloride), and the product is isolated by precipitation with excess water.

Preparation of DPO-BSA Concentrate Master Batch 52.25 lb/hr (23.75 Kg/hr) of AFFINITY* EG-8200, (1-octene based polyethylene plastomer having a 5 g/10 min MI, and a 0.87 g/cc density, commercially available from the Dow Chemical Company) and 2.75 lb/hr (1.25 Kg/hr) of DPO-BSA were separately fed into a 30 mm twin screw extruder manufactured by Werner & Pfleiderer, model #ZSK-30. The extruder had an inlet/feed throat and additional 5 zones following the inlet. The temperature profile for the extruder is shown below. These temperatures, except for the Melt Temperature, are barrel temperatures for the extruder. The resulting melt-extruded mixture of EG-8200 and DPO-BSA was passed through a strand die located at the exit of zone #5 and then through a cooling water bath (water temperature 20 C.) before being pelletized. The resulting DPO-BSA Concentrate Master Batch contains 5 weight percent DPO-BSA.

| Feed Throat | Room Temp |
| --- | --- |
| Zone #1 Temp (C.) | 100 |
| Zone #2 Temp (C.) | 100 |
| Zone #3 Temp (C.) | 100 |
| Zone #4 Temp (C.) | 100 |
| Zone #5/Die Temp (C.) | 120 |
| Melt Temp (C.) | 114 |
| Extruder Torque % | 60 |
| Extruder RPM | 170 |
| Die Pressure (psi) | 1900 |
| Output (lb/hr) | 55 |

Preparation of Modified Impact Copolymer Polypropylene (MICP)

The modified impact copolymer polypropylene (hereinafter "MICP") used for acquiring the data for FIGS. 1 through 4 is produced as follows. (MICP for the other examples is produced using similar procedures.) 1547 lb/hr (703.2 Kg/hr) of DC 111 was feed into a 92 mm twin screw extruder manufactured by Werner & Pfleiderer with the model #ZSK-92 using an individual feeder inlet.

The DPO-BSA Concentrate Master Batch and DC 111 were first fed into a blender with a weight ratio of 95.93 to 4.07 of DC 111 to DPO-BSA Concentrate Master Batch to insure homogeneous mixing. The above mixture was then fed into the same 92 mm twin screw extruder as the DC111 via another individual feeder inlet at a rate of 123 lb/hr (55.9 Kg/hr). The feed rate of the DC 111/DPO-BSA Concentrate were adjusted to introduce 150 ppm of DPO-BSA based on the total weight of the polymers present. An additive package was added via a third feeder. The additive package included a phenolic stabilizer available from Ciba Specialty Chemicals Company under the trade name IRGANOX 1010, a phosphite stabilizer available from Ciba Specialty Chemicals Company under the trade name IRGAFOS 168, calcium stearate, and glycerol monostearate. The feed rate of the additives was adjusted so that the resulting modified polymer resin has approximately 0.05 wt % of Calcium Stearate, approximately 0.06 wt % IRGANOX 1010, approximately 0.04 wt % IRGAFOS 168 and approximately 0.04 wt % glycerol monostearate.

The feed throat of the extruder was purged with nitrogen to reduce the oxygen level in the extruder. The temperature profile across the twin screw extruder from inlet to outlet was 200, 195, 180, 245, 245, 240, 240, 242, 242, and 253° C. The temperatures listed are barrel temperatures in the extruder. A die located at the outlet of the last zone had a temperature of 250–270° C. to ensure the full reaction of the BSA and propylene polymer. The resulting melt-extruded polymer went though the die and was then pelletized. The resulting coupled resin material is referred to herein as the MICP (0.35 MFR, 0.900 g/cc density, melt strength 71 cN, and approximately 7–9 weight percent ethylene content.

Polymer Resins

The resins used in the examples are described below.
1. DOWLEX* 2045A, 1 g/10 min MI, 0.920 g/cc density, MWD 3.7, LLDPE resin comprising a 1-octene comonomer, prepared using a Zigler-Natta type catalyst and a solution polymerization process, commercially available from The Dow Chemical Company.
2. MICP, bisulphonyl azide modified impact copolymer, fabricated as described above.
3. XU 61528.20, 0.920 g/cm$^3$ density, 0.5 g/10 min MI, MWD 3.7, LLDPE resin made with 1-octene comonomer, prepared using a Zigler-Natta type catalyst and a solution polymerization process, available from The Dow Chemical Company.
4. LDPE 611, 0.88 g/10 min MI resin, 0.924 g/cm$^3$, prepared using a free radical high pressure solution process, commercially available from The Dow Chemical Company.
5. ATTANE 4201, 1 g/10 min MI, 0.912 g/cc density, MWD 3.7, LLDPE resin made with 1-octene comonomer, prepared using a Zigler-Natta type catalyst and a solution polymerization process, commercially available from The Dow Chemical Company.
6. DOWLEX* 2049AC, 1 g/10 min MI, 0.926 g/cc density, MWD 3.7, LLDPE resin made with 1-octene comonomer, prepared using a Zigler-Natta type catalyst and a solution polymerization process, commercially available from The Dow Chemical Company.
7. DOWLEX* 2042A, 1 g/10 min MI, 0.930 g/cc density, MWD 3.7, LLDPE resin made with 1-octene comonomer, prepared using a Zigler-Natta type catalyst and a solution polymerization process, commercially available from The Dow Chemical Company.
8. DOWLEX* 2038, 1 g/10 min MI, 0.935 g/cc density, 7.7 I10/I2, MWD 3.7, LLDPE resin made with a 1-octene comonomer, prepared using a Zigler-Natta type catalyst and a solution polymerization process, commercially available from The Dow Chemical Company.
9. AFFINITY 1140, 1.6 g/10 min MI, 0.8965 g/cc density, MWD 2.4, substantially linear ethylene/1-octene copolymer, prepared using a CGC type catalyst and a solution polymerization process, available from The Dow Chemical Company.
10. Polyethylene Blend A, a 1 g/10 min MI, 0.916 g/cc density in-reactor blend consisting of: (a) 38 wt % of a substantially linear ethylene/1-octene copolymer having a 0.3 g/10 min MI and a density of 0.902 g/cc, prepared using a CGC type catalyst and a solution process; and (b) 62 wt % of a Ziegler-Natta catalyzed (solution process) ethylene/1-octene LLDPE having a 1.7 g/10 min MI and a 0.925 g/cc density.
11. LDPE I321, a 0.22 g/10 min MI, 0.9210 g/cc density resin, prepared using a free radical high pressure solution process, commercially available from The Dow Chemical Company.

Film Toughness

1. Blowing of Film in Egan Film Line at 25 lb/hr:
For FIGS. 1–4

Dowlex/MICP blends were prepared by blending the MICP resin with Dowlex 2045A in weight percentages of 15, 30 and 50 percent MICP. A description of how the DOWLEX 2045A/MICP resins were blended follows:

34 pounds (15.45 Kg) of DOWLEX 2045A and 6 pounds (2.73 Kg) of MICP were placed in a plastic drum which was covered with a plastic liner. The above drum was then sealed and loaded onto a tumble blender and tumbled for at least 45 minutes to ensure good mixing.

All the DOWLEX 2045A/MICP blends were prepared using similar procedures, except the ratio of DOWLEX 2045A to MICP was different.

The resulting resin blends were fed into an Egan blown film line available from Egan Corporation under model designation B00G345. During the blowing of the film, the Egan line was equipped with a 2.0 inch (5.08 cm) diameter screw, 3 inch (15.24 cm) diameter die, and a 70 mil (1750 micron) die gap. The extruder is 152.4 cm long with a length to diameter ratio (L/D) of 30. The temperature profile utilized was 415, 420, 425, 425, 430, 435, 440, 440 and 440 F. (212.8, 215.6, 218.3, 221.1, 223.9, 226.7 and 226.7 C.) from the rear to the front of the extruder and the die temperature was 460° F. (237.8° C.), with a blow-up ratio (BUR) of 2.5, and an output rate of 25 lb/hr. The frost line height was approximately 10 inches. (25.4 centimeters). The resulting film was 2.0 mil (50 micron) in thickness. The Elmendorf machine direction (MD) tear, Elmendorf cross direction (CD) tear, dart impact and puncture values were measured for all of the films made from the DOWLEX 2045A/MICP blends and are shown in FIGS. 1-4, respectively.

For comparison, blown films were produced, on the same Egan line under similar conditions, from various ethylene/1-octene copolymers (DOWLEX 2045A, DOWLEX 2049AC, DOWLEX 2042A, DOWLEX 2038, and ATTANE 4201) having secant moduli in a similar range as the Dowlex 2045A/MICP blends. The Elmendorf machine direction (MD) tear, Elmendorf cross direction (CD) tear, dart impact and puncture values were measured for all of these films and are also shown in FIGS. 1-4, respectively.

Figure 2:
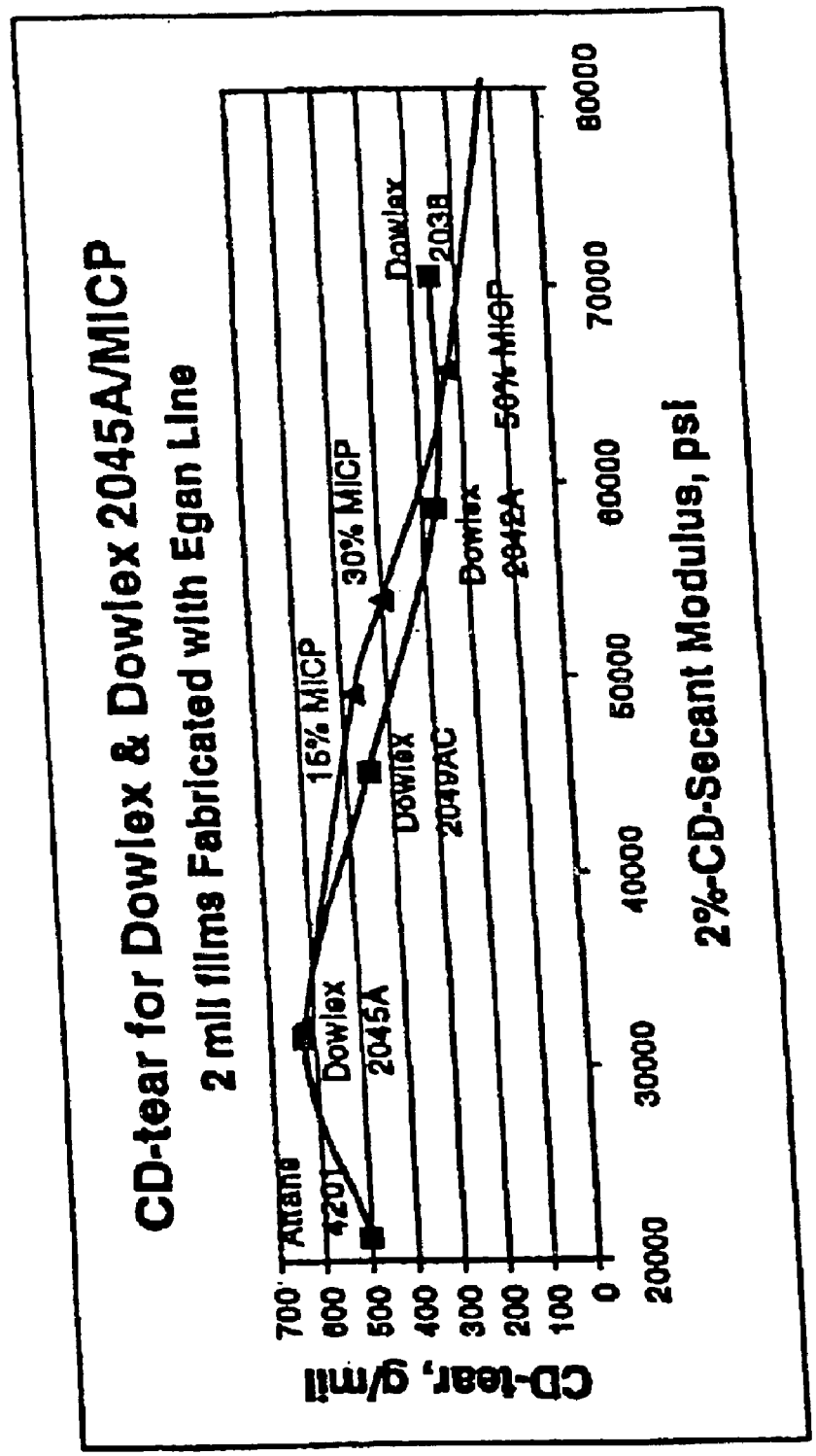
FIG. 2 shows a line graph of Elmendorf cross direction tear versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 2 had a melt index of 1.
Figure 3:
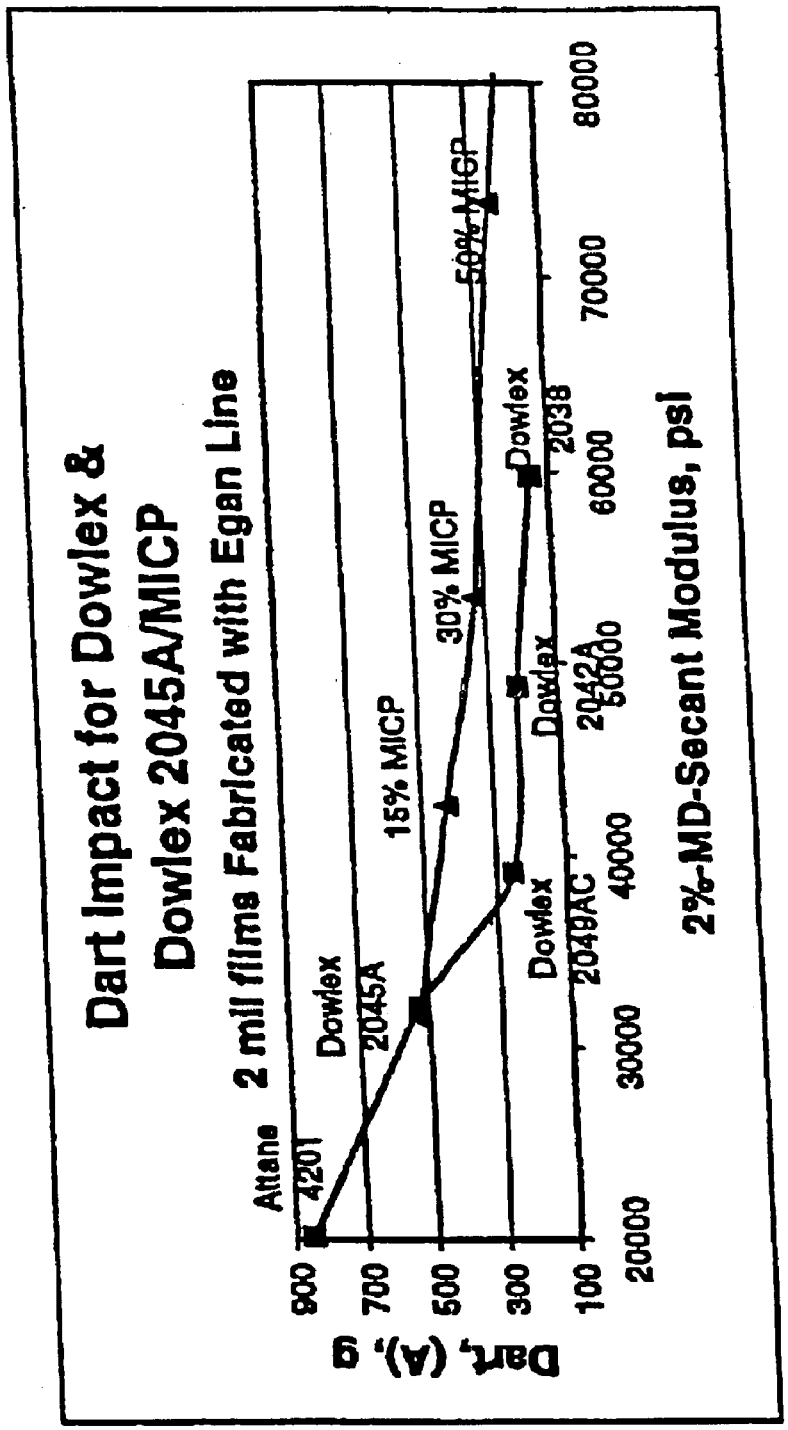
FIG. 3 shows a line graph of dart impact strength versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 3 had a melt index of 1.
Figure 4:
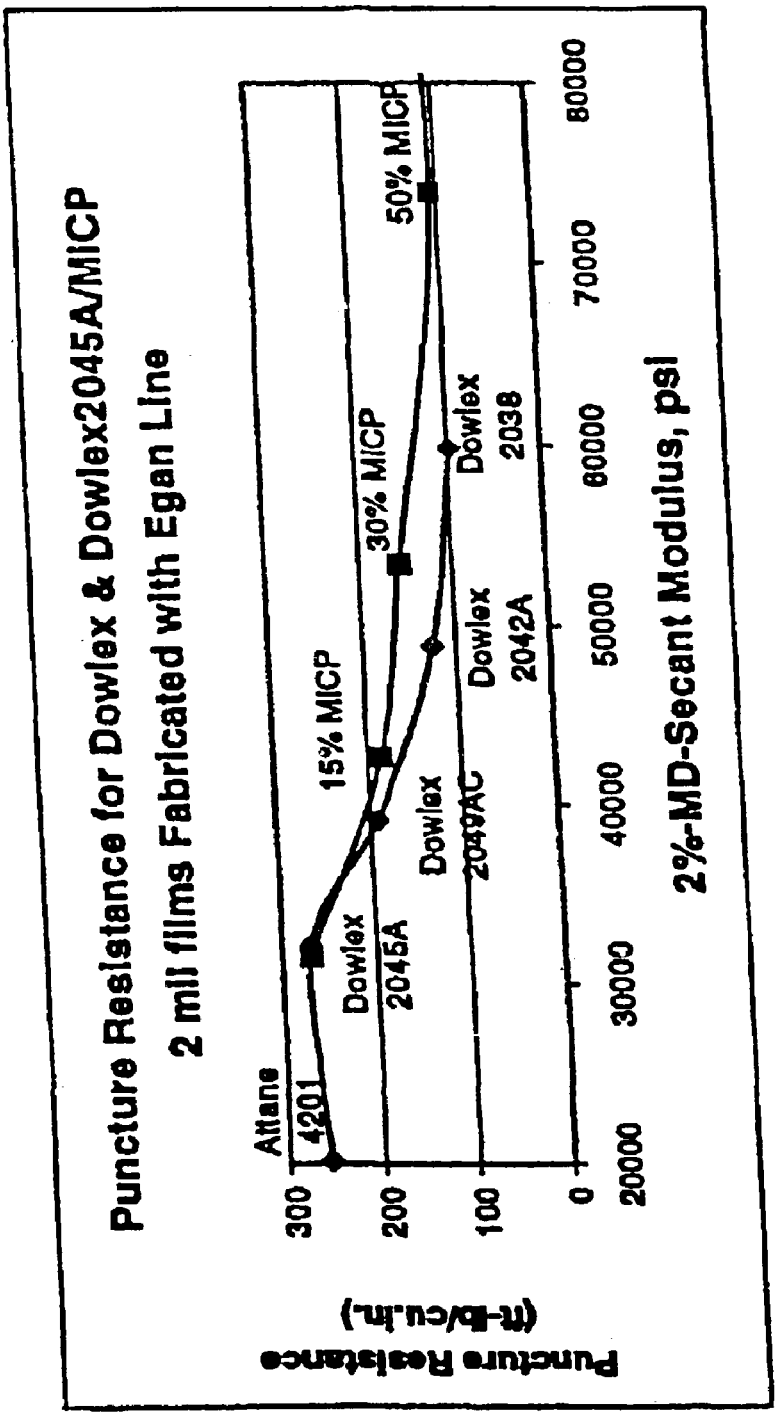
FIG. 4 shows a line graph of puncture resistance versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 4 had a melt index of 1.

As shown in FIG. 1, the MD Elmendorf tear strength is higher for a 2 mil film blown from the inventive blends containing 15 and 30% MICP than for a 2 mil film blown from an ethylene/1-octene LLDPE resin having the same 2% MD secant modulus. Likewise, FIG. 2 shows that the CD Elmendorf tear strength is higher for a 2 mil film blown from the inventive blends containing 15 and 30% MICP than for a 2 mil film blown from an ethylene/1-octene LLDPE resin having the same 2% CD secant modulus. Also, as shown in FIG. 3, the dart impact strength is higher for a 2 mil film blown from the inventive blends containing 15 and 30% MICP than for a 2 mil film blown from an ethylene/1-octene LLDPE resin having the same 2% MD secant modulus. Additionally, the puncture value, as shown in FIG. 4, is higher for a 2 mil film blown from the inventive blends containing 15 and 30% MICP than for a 2 mil film blown from an ethylene/1-octene LLDPE resin having the same 2% MD secant modulus. The applicants believe that if the trend lines of FIGS. 1-4 are extrapolated as necessary, that the above advantages would be minimal or non-existent at a 50:50 blend of Dowlex 2045A and MICP. The chain length of alpha-olefin comonomers affects the film mechanical properties of ethylene copolymers, especially at low modulus values. In particular, ethylene copolymers comprising longer chain alpha-olefin comonomers will have improved properties compared to copolymers comprising shorter chain alpha-olefin comonomers. As such, comparisons of the mechanical properties of the blend are only valid against polyethylenes comprising the same comonomer as the ethylene polymer used in the inventive blend. If ethylene polymers having more than one type of comonomer (or made from more than one type of catalyst or process) are present, the PE/PP blend of the current invention will provide better toughness properties than a comparable polyethylene (comparable to either polyethylene component of the ethylene rich phase as long as that polyethylene makes up at least 60% of the ethylene rich phase) having an equivalent 2% secant modulus as the PE/PP blend. For convenience, the toughness properties of the PE/PP blend of the current invention can be compared against the toughness properties of an ethylene polymer having the same comonomer as the ethylene polymer that makes up the majority of the PE rich phase, and an equivalent 2% secant modulus as the PE/PP blend. Additionally, when comparing the toughness properties of one polyethylene to another, it is important that the polyethylenes have approximately the same MI's, typically, within 25% of one another. One skilled in the art will recognize that the comonomer mole percent will be different for ethylene polymers having different modulus values.

Examples 1–3 and Comparative Samples A–C

Moreover, iii another comparison, two polymer blends were prepared with MICP and Dowlex 2045A in weight ratios of 35:65 and 65:35 MICP:Dowlex 2045A, respectively. The MICP was prepared in a manner similar to that used for FIGS. 1 through 4. Films were fabricated from these blends on a blown film line consisting of a 2.5 inch diameter, 30:1 length to diameter (L/D) Gloucester extruder, equipped with a 6 inch diameter, spiral mandrel, and a blown film die. The die gap is 70 mil, frostline height is 35 inch and the output rate is 150 lb/h (68.2 Kg/h). The temperature profile utilized was 410, 420, 420, 420, and 420 F. (210, 212.8, 212.8, 212.8, and 212.8 C.) from the rear to the front of the extruder. The adapter temperature was 480 F. (248.9 C.), die temperature was 480° F. (248.9° C.) and the melt temperature was 500 F. (260 C). A dual lip air-ring was used to cool and stabilize the film during extrusion. Film was hauled-off and wound on conventional polyethylene blown film equipment designed and fabricated by Gloucester Engineering. The target film thickness was 2 mil at three BURs of 1.5, 2.5 and 3.5, respectively. The thickness, dart impact, and tear values were measured with the results shown in Table 1.

The results shown in Table 1 are not directly comparable to the results shown in FIGS. 1–4 because of the differences in the film fabricating conditions. In order to be directly comparable, films should be made under approximately the same conditions. To be directly comparable, it is not necessary that all the conditions listed below be exactly the same for each film sample. However, to be directly comparable, it is necessary: that for each condition the variance between the film samples is close enough; and that enough of the individual conditions are close enough, so that one of skill in the art would consider the conditions under which the films were produced to be directly comparable. At a minimum, the following conditions should be approximately the same: blown film line used, blow-up ratio (BUR), film thickness, die gap, output rate, and die diameter for the production of the films to be compared. Preferably, the temperature profile, type of die, type of screw, and quench are also the same or approximately the same for the different resins being run.

As shown in Table 1, films made from the inventive blends (Ex. 1–3) have markedly superior mechanical properties than films made from the comparative samples (C.S. A–C) which contain more than 50% MICP. For example, the dart impact of the comparative samples were only 13–32% of the dart impact of the inventive example made at the same BUR. Likewise, the Elmendorf MD tear values of the comparative samples were only 13–23% of the Elmendorf MD tear values of the inventive example made at the same BUR. Also, Elmendorf CD tear values of the comparative samples were only 28–37% of Elmendorf CD tear values of the inventive example made at the same BUR. Additionally, the same effect is seen, to a lesser extent, in the values for energy to break and average puncture where the values of the comparative samples were only 70–88% and 71–88%, respectively, of the corresponding values of the inventive example made at the same BUR. Some of the decrease in mechanical properties for the comparative samples is expected because of the higher secant modulus of the comparative samples relative to the inventive examples. However, the decrease in mechanical properties is more than would be expected from just increasing the secant modulus and may be indicative of the inherent incompatibility of the polypropylene and the polyethylene.

TABLE 1

| Sample | Film Properties | | | | | |
|---|---|---|---|---|---|---|
|  | Ex. 1 | Ex. 2 | Ex. 3 | C.S. A | C.S. B | C.S. C |
| Composition |  |  |  |  |  |  |
| % MICP (PP) | 35 | 35 | 35 | 65 | 65 | 65 |
| % Dowlex 2045A (LLDPE) | 65 | 65 | 65 | 35 | 35 | 35 |
| Blow-up-Ratio | 1.5 | 2.5 | 3.5 | 1.5 | 2.5 | 3.5 |
| Avg Thickness MD, (mil) | 2.0 | 2.0 | 2.0 | 1.8 | 1.9 | 1.8 |

TABLE 1-continued

| | Film Properties | | | | | |
|---|---|---|---|---|---|---|
| Sample | Ex. 1 | Ex. 2 | Ex. 3 | C.S. A | C.S. B | C.S. C |
| Avg Thickness CD, (mil) | 2.0 | 2.0 | 2.0 | 1.8 | 2.0 | 2.0 |
| Dart Impact, Method A, (g) | 276 | 276 | 286 | 36 | 64 | 92 |
| Elmendorf Tear | | | | | | |
| Avg Elmendorf Type B MD, (g) | 260 | 270 | 243 | 33 | 58 | 55 |
| Avg Elmendorf Type B CD, (g) | 612 | 579 | 538 | 188 | 212 | 151 |
| Secant Modulus | | | | | | |
| MD-Avg 1% SECANT, (psi) | 82,848 | 75,711 | 77,123 | 105,192 | 104,402 | 99,593 |
| CD-Avg 1% SECANT, (psi) | 65,438 | 71,000 | 71,744 | 107,007 | 85,176 | 92,109 |
| MD-Avg 2% SECANT, (psi) | 66,123 | 62,471 | 64,003 | 84,763 | 80,890 | 78,528 |
| CD-Avg 2% SECANT, (psi) | 54,161 | 56,659 | 60,106 | 83,714 | 71,742 | 72,369 |
| Puncture Strength | | | | | | |
| Avg Energy to Break, (in-lb) | 43 | 51 | 50 | 30 | 38 | 44 |
| Avg Puncture, (ft-lb/in$^3$) | 146 | 171 | 169 | 106 | 122 | 148 |

Example 4 and Comparative Sample D

In another comparison, a polymer blend (Ex. 4) was made by mixing 25 wt. % MICP with 75 wt. % XU 61528.20 LLDPE. A comparative blend (C.S. D) was made by mixing 93 wt. % XU 61528.20 with 7 wt. % LDPE 611. Films were blown from these blends under similar fabrication parameters as Examples 1–3 except 120 lb/h (54.5 kg/h) output rate was used. The film properties were measured and are reported in Table 2.

As shown in Table 2, the inventive film (Ex. 4) is a substantial improvement over a typical LLDPE/LDPE blend (C.S. D). In particular, the MD modulus and CD modulus of Ex. 4 are, respectively, 24 and 36% higher than the corresponding moduli of C.S. D but the mechanical properties of Ex. 4 are equivalent to the properties of C.S. D.

TABLE 2

LLDPE Rich Blends with Rheology Modified PP Versus LLDPE/LDPE Blends

| Sample | C.S. D | Ex. 4 |
|---|---|---|
| XU 61528.20 | 93 | 75 |
| MICP | | 25 |
| LD 611 | 7 | |
| Operating parameter | | |
| Back press, (psi) | 4890 | 4080 |
| Rate/RPM | 2.68 | 2.3 |
| Film Properties | | |
| Dart Impact, method-A, (g) | 333 | 372 |
| Ave. Thickness in MD, (mil) | 0.66 | 0.66 |
| Normalized Elmendorf type B MD-tear, (g/mil) | 238 | 226 |
| Ave. Thickness in CD, (mil) | 0.66 | 0.62 |
| Normalized Elmendorf type B CD-tear, (g/mil) | 633 | 611 |
| MD-2% Secant, (psi) | 29384 | 36336 |
| CD-2% Secant, (psi) | 32666 | 44396 |
| CD-Ultimate Tensile, (psi) | 6411 | 4625 |
| MD-ultimate Tensile, (psi) | 8680 | 9720 |
| Ave. Puncture Resistance, (ft-lb/cu. in) | 250 | 220 |

As discussed earlier, the inventive blends of the current application provide improved tear resistance and dart impact strength over polyethylene copolymers having equivalent modulus and made from the same comonomer as the polyethylene copolymer contained in the inventive blend. The inventive blends of the current application may provide similar tear resistance and dart impact strength but improved modulus. Additionally, as discussed above, the modified polypropylenes used in the inventive blends, provide improved processability to the blends. This improved processibility will allow articles to be formed from the blends over broader processing conditions and/or will improve maximum throughput with which the blends can be converted into articles.

Example 5 and Comparative Sample E

Table 3 shows a comparison of the processability of a blend containing an unmodified polypropylene and a polyethylene with a blend containing a modified polypropylene (as used in the current invention) and a polyethylene. The blend of Ex. 5 was made by mixing 35 wt % MICP with 65 wt % DOWLEX 2045A. A comparative blend (C.S. E) containing DC 111 and DOWLEX 2045A in a weight ratio of 35:65, respectively was made in a similar manner. Films were blown from these blends under similar conditions for the blends of Examples 1–3 and C.S. A–C. In this comparison, the desire was to make films of similar thickness at similar throughput rates. As can be seen from Table 3, the inventive blend (Ex. 5) was readily processable on the film line while the comparative blend of C.S. E could not be processed into a film under comparable conditions.

TABLE 3

| | Output Rate (lb/hr) | Film Target Thickness (mil) | Description of Process |
|---|---|---|---|
| Comparative Sample E | "Could not produce 0.8 mil sample due to stability problems" | | |
| Example 5 | 147.0 | 0.8 | Very Nice |

In additional tests, the blends of C.S. E and Ex. 5 were made into 2 mil film using a blown film line similar to the line used to generate the data of Table 1. In these tests the processing conditions were varied in order to determine the maximum throughput for each blend. For the equipment used in this comparison, the maximum throughput for the blend of Ex. 5 was 261 lbs/hr, with the throughput rate believed to be limited by the amount of cooling air (quench) available for the film line. It is believed that even higher throughput rates could have been achieved with the blend of Ex. 5 if additional cooling air would have been provided. In comparison, the maximum throughput for the blend of C.S.

E was 206 lbs/hr, with the throughput rate believed to be limited by the stability of the bubble formed during the processing. Therefore, it can be seen that the blend of Ex. 5 is much more readily processed at higher throughputs rates than C.S. E.

Heat Shrinkage

Figure 5:
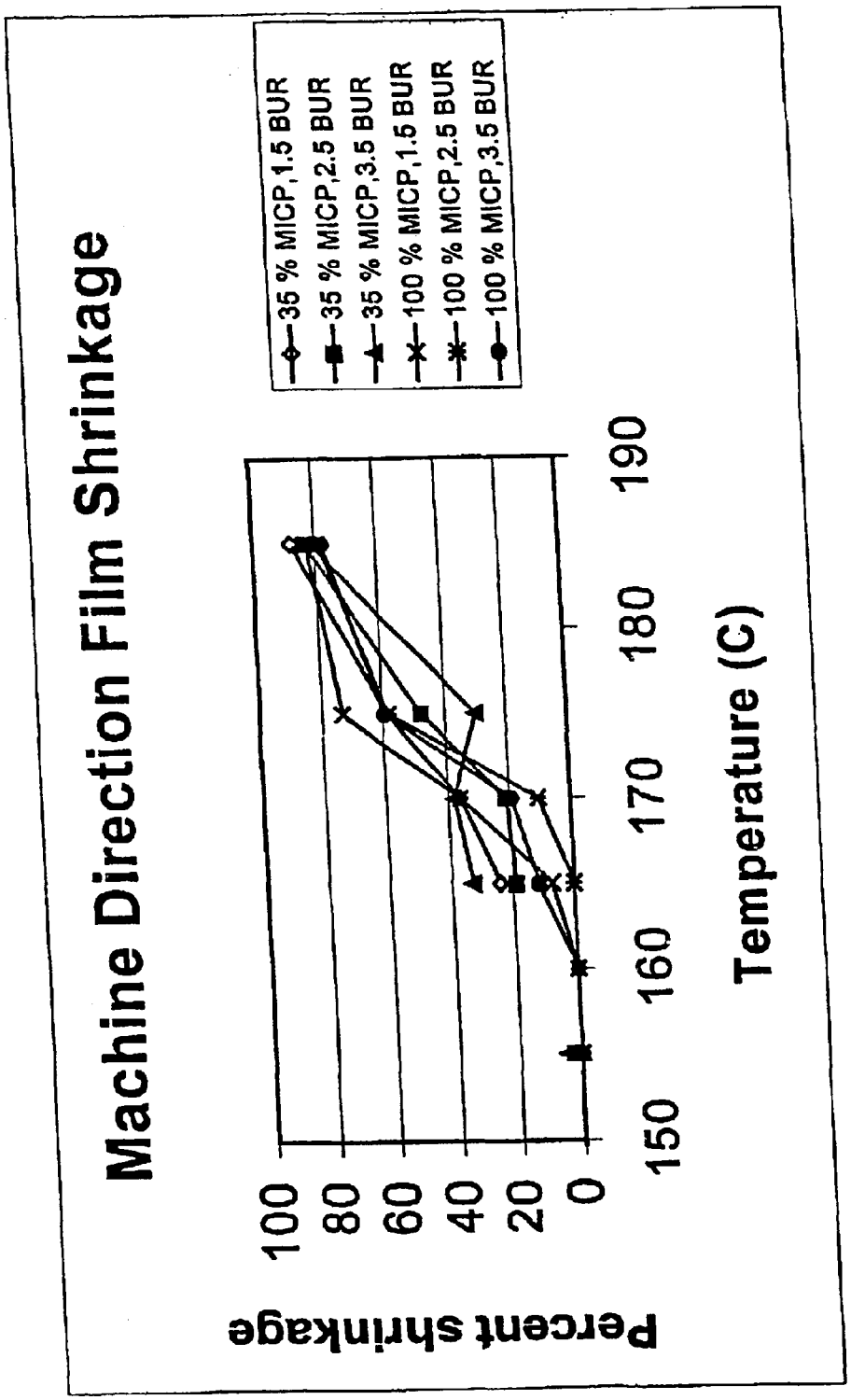
FIG. 5 shows a line graph of machine direction shrinkage versus temperature for films made from blends of ethylene/1-octene LLDPE/modified impact copolymer PP and from the modified impact copolymer polypropylene alone.
Figure 6:
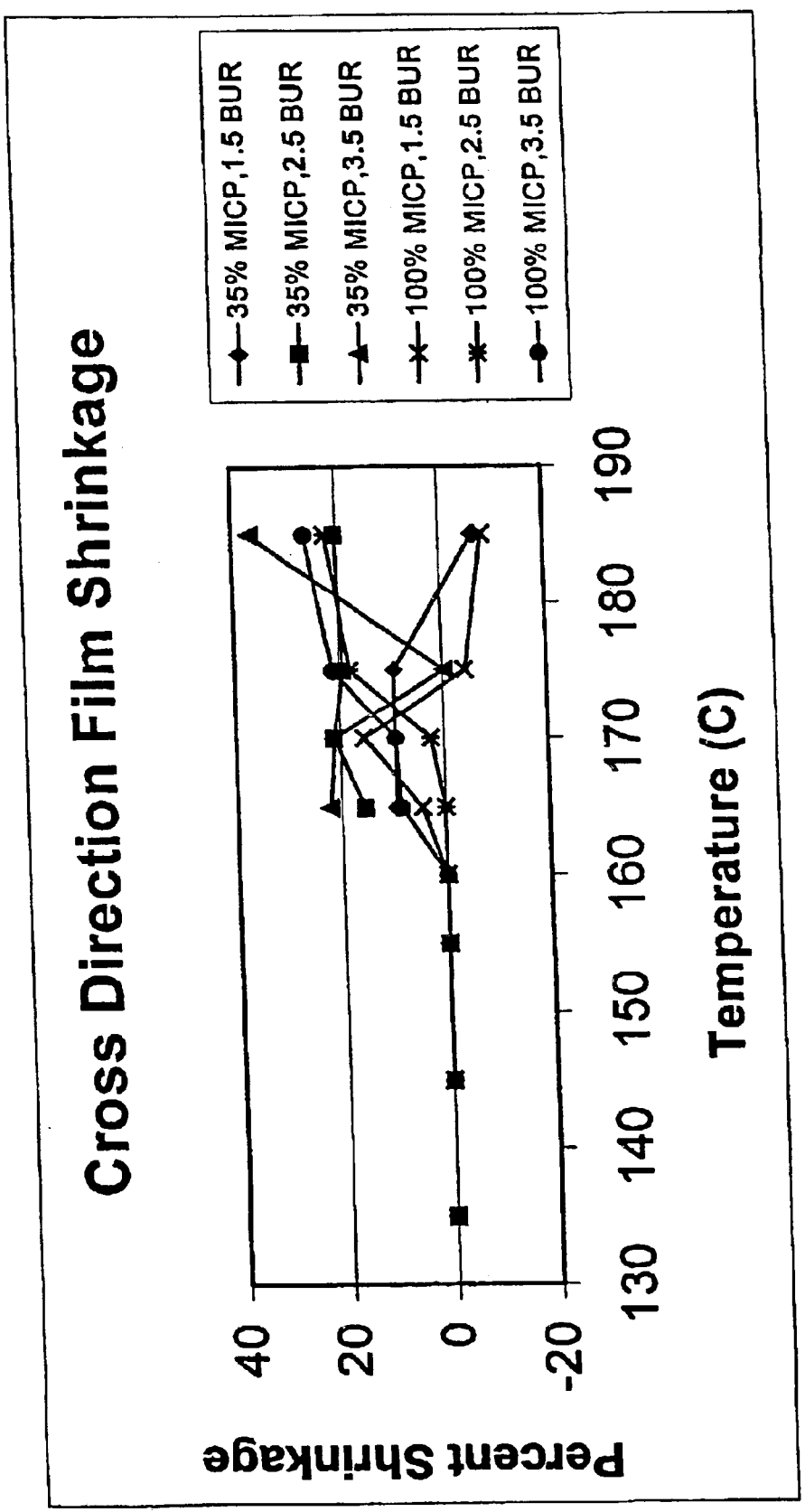
FIG. 6 shows a line graph of cross direction shrinkage versus temperature for films made from blends of ethylene/1-octene LLDPE/modified impact copolymer PP and from the modified impact copolymer polypropylene alone.

An inventive blend was made by mixing 35 weight percent (wt. %) MICP, based on the total weight of the blend, with 65 wt. % Dowlex 2045A. Films were blown from this inventive blend and from a 100% MICP resin. The blown film samples were cut into 4"×4" (10.16 cm×10.16 cm) squares and placed between two metal screen holders. The metal screen holder was then immersed into a hot oil bath at a pre-designed temperature for 30 seconds. The MD and CD shrinkage were measured according to ASTM 2732. The test results are shown in FIGS. 5 and 6 for MD shrinkage and CD shrinkage, respectively.

As shown in the Figures, films formed from the 35% MICP inventive blend had similar shrink properties to the film made from 100% MICP with the same BUR. At test temperatures below 160 C., very low shrinkage is observed with any of the films, indicating excellent dimensional stability of the films, even at elevated temperatures. For comparison, all polyethylenes soften or melt at temperatures below 130 C. At temperatures of 170–185 C., the films exhibit high shrinkage in the machine direction and the desired shrinkage in the range of 10–30% in the cross direction. For bundling films, it is important that films exhibit both a high degree of shrink (40–80%) in the machine direction plus positive shrink of 10–30% in the cross or transverse direction. The Figures also show that increasing the blow-up ratio or the diameter of the bubble during fabrication results in increased cross direction shrinkage at a given temperature. This allows the film fabricator to control the amount of shrinkage exhibited by the film, through control of the fabrication parameters used to manufacture the film.

It is unusual for LLDPE rich films to exhibit significant shrinkage in the cross direction. For most applications, it has traditionally been necessary to add LDPE to the LLDPE film in order to obtain cross direction shrinkage in the range of 10–30%. This data indicates that the desired shrinkage can be obtained through blending of a coupled propylene polymer, preferably, a coupled impact copolymer polyproylene instead of LDPE. The inventive blend of the invention is readily processable and provides a film that is dimensionally stable up to 140 C., preferably 150 C., more preferably 160 C., but that provides excellent shrink characteristics at higher temperatures.

Blocking

A series of polymer blends were made by mixing MICP with an LLDPE (DOWLEX 2045A) in weight percentages of MICP of 0, 15, 30, 50, 70, 85 and 100%, based on the weight of the combined polymers. None of these blends contained an antiblock additive. Films were blown from these blends on an Egan blown film line. The blown film line consisted of a 2.0 inch screw diameter, 30:1 L/D extruder, equipped with a 3 inch die diameter and was operated under similar conditions for all of the polymer blends. The film was hauled-off and wound on conventional polyethylene blown film equipment designed and fabricated by MacroEngineering. The average blocking was determined for each sample and the results are shown in Table 4. The blockage is measured according to the standard ASTM method 3354. As shown in Table 4, the blends of MICP and polyethylene had a lower average block than did the polyethylene alone. This improved blocking performance will reduce the amount of antiblocking agents, such as SiO2, that are typically used in some film applications.

TABLE 4

Film Properties and Blocking Data
Blends of Dowlex 2045A LLDPE and MICP

| % MICP | Blocking |
| --- | --- |
| 0 | 69.24 |
| 15 | 8.92 |
| 30 | 12.86 |
| 50 | 8.64 |
| 70 | 5.04 |
| 85 | 5.02 |
| 100 | 12.5 |

Examples 6 through 9, and Comparative Sample F

Moreover, in another comparison, four polymer blends were prepared with MICP and AFFINITY 1140 (Ex. 6), ATTANE 4201 (Ex. 7), Polyethylene Blend A (Ex. 8), and DOWLEX 2045A (Ex. 9) in weight ratios of 35:65 MICP to the polyethylene polymers. The MICP was prepared in a manner similar to that used for FIGS. 1 through 4. Films were fabricated from these blends on a blown film line consisting of a 2.5 inch diameter, 30:1 length to diameter (L/D) Gloucester extruder, equipped with a 6 inch diameter, spiral mandrel, and a blown film die. The die gap is 70 mil, frostline height is 35 inch and the output rate is 150 lb/h (68.2 Kg/h). The film processing conditions were similar to the processing conditions used for Examples 1–3 and Comparative Samples A–C. The thickness, dart impact, Elmendorf tear, secant modulus and puncture resistance were measured with the results shown in Table 5.

The results shown in Table 5 are not directly comparable to the results shown in FIGS. 1–4 because of the differences in the film fabricating. However, it can be seen from Table 5 that the PE/PP blend comprising Polyethylene Blend A provides a superior combination of high modulus, tear strength and impact properties compared to blends composed of only one polyethylene. Additionally, it can be seen from the Table 5 that the PE/PP blend containing Polyethylene Blend A has a 2% Secant modulus measured in the machine direction that is at least twice the 2% Secant modulus of Polyethylene Blend A measured in the machine direction and exhibits mechanical properties balance.

TABLE 5

| | Ex. 6 | Ex. 7 | Ex. 8 | Ex. 9 | CS F |
| --- | --- | --- | --- | --- | --- |
| Component 1 | MICP | MICP | MICP | MICP | Polyethylene Blend A |
| % Component 1 | 35 | 35 | 35 | 35 | 100 |
| Component 2 | AFFINITY 1140 | ATTANE 4201 | Polyethylene Blend A | DOWLEX 2045 | |

TABLE 5-continued

|  | Ex. 6 | Ex. 7 | Ex. 8 | Ex. 9 | CS F |
|---|---|---|---|---|---|
| % Component 2 | 65 | 65 | 65 | 65 |  |
| Film Thickness (mil) | 2 | 2 | 2 | 2 | 2 |
| Dart Impact |  |  |  |  |  |
| (g) Method A | 454 | 354 | 430 | 276 | >850 |
| Elmendorf Tear Strength, (g) |  |  |  |  |  |
| Avg Elmendorf Type B MD | 464 | 366 | 468 | 270 | 825 |
| Avg Elmendorf Type B CD | 367 | 633 | 581 | 579 | 1014 |
| Secant Modulus (psi) |  |  |  |  |  |
| MD-Avg 2% SECANT | 36,032 | 52,388 | 58,293 | 62,471 | 24,054 |
| CD-Avg 2% SECANT | 29,784 | 45,874 | 48,757 | 56,659 | 27,733 |
| Puncture Resistance |  |  |  |  |  |
| Avg Puncture (ft-lb/cu. in.) | 243 | 162 | 174 | 171 | 334 |
| Blow-up-rate | 2.5 | 2.5 | 2.5 | 2.5 | 2.5 |
| Throughput (lb/hr) | 150 | 150 | 150 | 150 | 150 |

Heat Seal and Hot Tack, FIGS. 7 and 8:

Dowlex/MICP blends were prepared by blending the MICP resin with Dowlex 2045A in weight percentages of 15, 25, 35, and 45 percent MICP. Additionally, a blend was made from 80 weight percent Dowlex 2045A and 20 weight percent LDPE 132I. The resins were blended as described for FIGS. 1 through 4.

The resulting resin blends were fed into an Egan blown film line as described for FIGS. 1 through 4, which was operated as described for FIGS. 1 through 4. The peak load (seal strength) and hot tack were measured for the films in accordance with the procedures described above.

As shown in FIG. 7, the films made from blends of 15, 25, and 35 weight % MICP performed similarly to the films made from a blend of 80/20 Dowlex 2045A/LDPE 132I. It can also be seen from FIG. 7 that the films made from blends containing 15 and 25 weight % MICP exhibited effectively the same or better peak load at 120 C. and above as the film made from the Dowlex 2045A/LDPE 132I blend. It can also be seen from FIG. 8 that the films made from blends of 15, 25, and 35 weight % MICP had a hot tack initiation temperature similar to the hot tack initiation temperature exhibited by the film made from the Dowlex 2045A/LDPE 132I blend. Further, as can be seen from FIG. 8, all the films made from Dowlex 2045A/MICP blends exhibited better hot tack strength at temperatures at and above 120 C. than films made from the Dowlex 2045A/LDPE 132I blend. The above sealing characteristics makes the Dowlex 2045A/MICP blends highly desirable for films requiring hot fill and/or high sealing temperature conditions.

Examples 10 and 11 and Comparative Sample G

In another comparison, two polymer blends are prepared using MICP and Dowlex 2045A in weight ratios of 20:80 and 35:65 MICP:Dowlex 2045A, respectively. The MICP is prepared in a manner similar to that used for FIGS. 1 though 4. A blend of Dowlex 2045A and LDPE 132I is made as a comparative blend in the weight ratio of 85:15 Dowlex 2045A:LDPE 132I (a blend that exhibits similar processing characteristics to MICP/Dowlex 2045A blends and is often used for compression packaging applications). Films are fabricated from these blends on a blown film line consisting of a 2.5 inch diameter, 24:1 length to diameter (L/D) Macro Engineering extruder, equipped with a MC barrier screw and a 6 inch diameter blown film die. The die gap is 40 mil and the output rate is 10.5 lb/h/inch die diameter. Film was hauled-off and wound on conventional polyethylene blown film equipment designed and fabricated by Macro Engineering. The thickness of the film produced is as shown in Table 6. The blow-up-ratio for all films is 2.2. The impact strength, stiffness (2% Secant Modulus), resistance to stretch (% Strain) and Elmendorf tear are measured and are shown in Table 6. As can be seen from Table 6, the films made from the blends of MICP/Dowlex 2045A provide significant improvements in resistance to stretch over comparative Dowlex 2045A/LDPE 1321 blends. This allows for significant opportunities to downgauge the thickness of film used for such applications as compression packaging. Examples of compression packaging applications are films used to make bags, sacks, and/or other containers that are designed to hold compressed goods such as thermal insulation, peat moss, silage, and other compressible goods. Additionally, for a given thickness container, more material can be stuffed into the container, without compromising the integrity of the container.

TABLE 6

| Material | C.S. G 85/15 wt % DOWLEX 2045A*/ LDPE 1321 Blend | Ex. 10 20/80 wt % MICP/Dowlex 2045A Blend | Ex. 11 35/65 wt % MICP/Dowlex 2045A Blend |
|---|---|---|---|
| Film Thickness |  |  |  |
| Average Thickness (mil) | 4.1 | 3.1 | 2.8 |
| Gauge Reduction (%) | — | 24 | 32 |
| Impact Strength (ASTM |  |  |  |

TABLE 6-continued

| Material | C.S. G 85/15 wt % DOWLEX 2045A*/ LDPE 1321 Blend | Ex. 10 20/80 wt % MICP/Dowlex 2045A Blend | Ex. 11 35/65 wt % MICP/Dowlex 2045A Blend |
|---|---|---|---|
| D1709 Method A) | | | |
| Dart Impact Strength (g) Stiffness/Machinability (ASTM D882) | 413 | 566 | 345 |
| 2% Secant Modulus (lb.) MD | 130 | 167 | 204 |
| 2% Secant Modulus (lb.) CD | 140 | 146 | 175 |
| Increased Load Resistance (%) MD | — | 28 | 57 |
| Increased Load Resistance (%) CD Resistance to Stretch | — | 5 | 25 |
| Strain @ 9 MPA (%) MD | 10 | 3 | 2 |
| Strain @ 9 MPA (%) CD Elmendorf Tear (ASTM D1922) | 8 | 4 | 2 |
| Tear Strength, MD (g) | 1280 | 967 | 302 |

Figure 9:
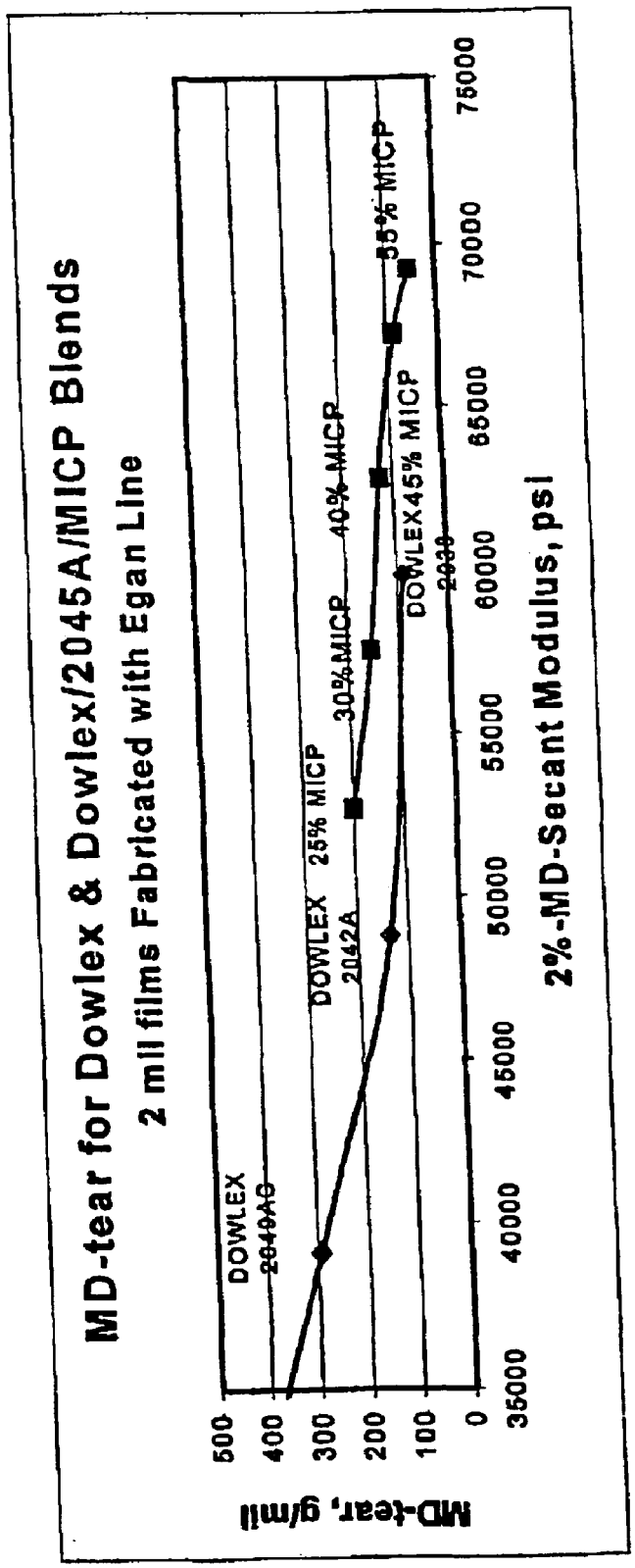
FIG. 9 shows a line graph of Elmendorf machine direction tear versus 2% secant modulus for films made from blends of ethylene/1-octene LLDPE copolymers/modified impart copolymer PP and from ethylene/1-octene LLDPE copolymers alone. The ethylene/1-octene copolymers used for FIG. 9 had a melt index of 1.
Figure 10:
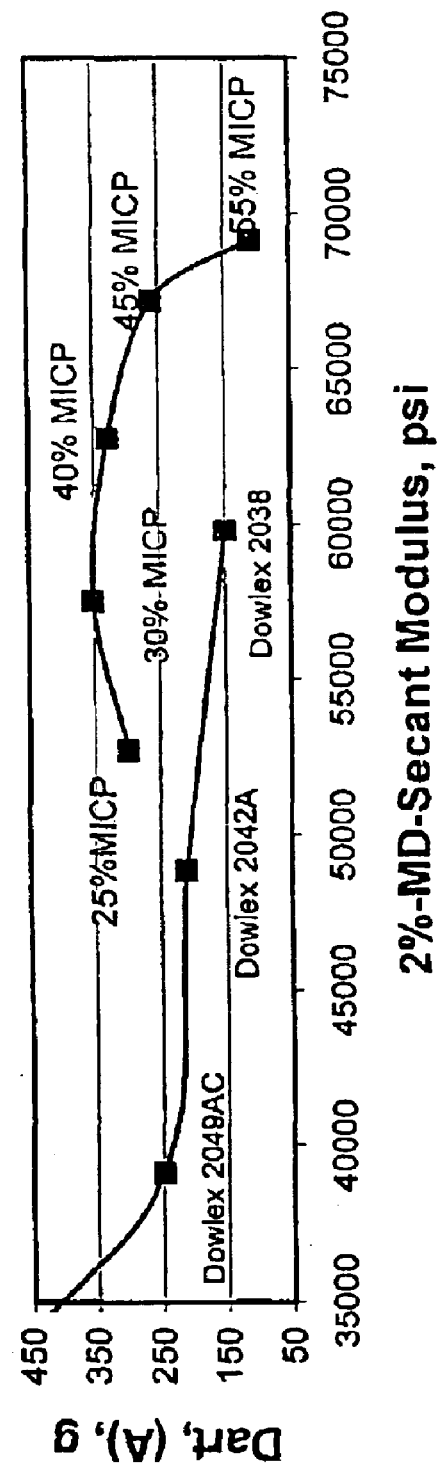
FIG. 10 shows a line graph of dart impact strength versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 10 had a melt index of 1.
Figure 11:
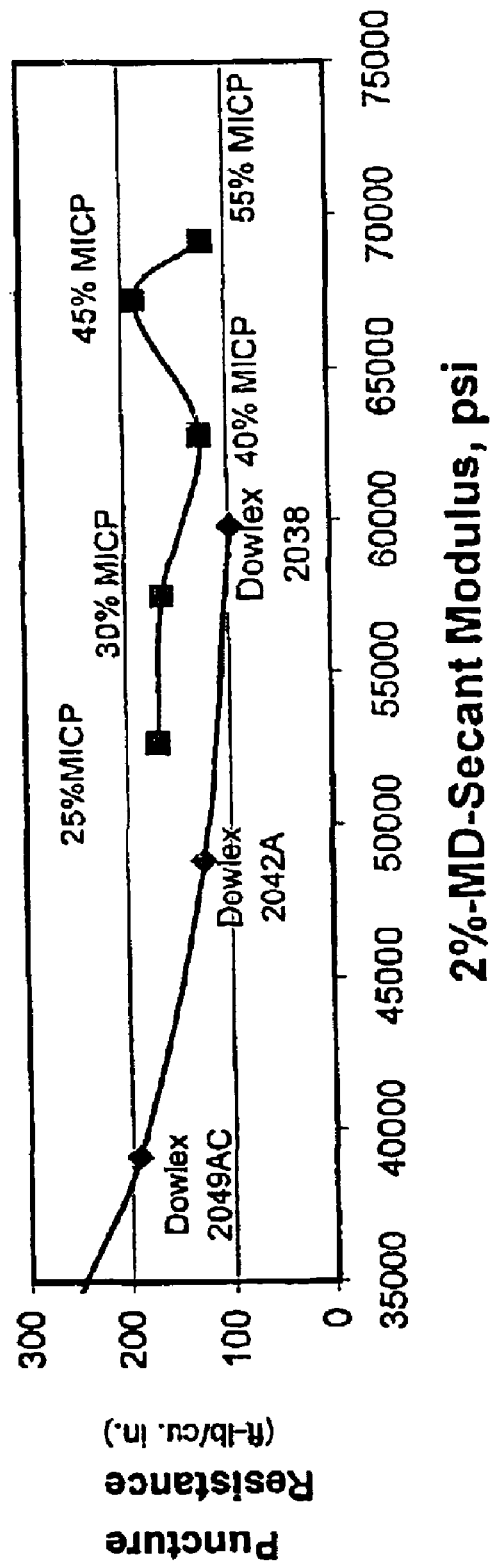
FIG. 11 shows a line graph of puncture resistance versus 2% secant modulus for films made from blends of ethylene/1-octene LLDPE copolymers/modified impact copolymer PP and from ethylene/1-octene LLDPE copolymers alone. The ethylene/1-octene copolymers used for FIG. 11 had a melt index of 1.

FIGS. 9, 10, and 11:

Dowlex/MICP blends are prepared by blending the MICP resin with Dowlex 2045A in weight percentages of 25, 30, 40, 45, and 55 percent MICP. The MICP is prepared in a manner similar to that used for FIGS. 1 though 4 and the blends are manufactured into films using the same equipment and procedures set forth for the blends described in FIGS. 1 through 4. Only the MD Elmendorf tear values are shown since the MD Elmendorf tear values are more limiting to the performance of the film than the CD Elmendorf tear values (which are higher for blown films made according to the processing described for FIG. 9). As can be seen from FIGS. 9, 10, and 11 the weight percentage of the polyethylene should be greater than 55%, preferably great than 60%.

We claim:

1. A blend composition comprising:
   (a) at least one propylene polymer having a melt strength of at least 20 cN; and
   (b) greater than 55% by weight based on the combined weight of component (a) and (b), of at least one ethylene polymer having a density of from 0.90–0.94 g/cm³ and having a melt index (as measured in accordance with ASTM D 1238, at a tamperature of 190° C. under a weight of 2.16 KG) of at least 0.1" g/10, min.

2. The blend composition of claim 1, wherein: (i) the modulus of a film made from the blend is higher than the modulus of a film made from component (b); and (ii) a film made from the composition has higher film toughness properties, compared with a film formed in approximately the same manner from a comparable ethylene polymer resin having a 2% secant modulus equivalent to the composition and thc same comonomer as (b), of at least one of: tear resistance in either the machine direction (MD) or cross direction (CD) as measured by the Elmendorf Tear method (ASTM D-1922); or dart impact strength as measured by the procedure of ASTM D-1709 or a modified method thereof in which the height from which thc dart is dropped is decreased from 26" to 10.5"(0.66 m to 0.27 m), or puncture resistance.

3. The blend composition of claim 1, wherein the at least one propylene polymer has a melt strength of at least 40 cN.

4. The blend composition of claim 1, wherein the at least one propylene polymer has a molt strength of at least 50 cN.

5. The blend composition of claim 1, wherein the at least one ethylcnc polymer comprises at least 60% by weight of the blend.

6. The blend composition of claim 1, wherein the at least one ethylene polymer has a density of from 0.905–0.925 g/cm³ and a melt index of at least 0.5 g/10 min.

7. The blend composition of claim 1, wherein a blown film wade from the blend composition exhibits a mechanical properties balance.

8. The blend composition of claim 1, wherein the at least one propylene polymer is an impact propylene copolymer that has been reacted with a bis(sulfonyl azide) and component (b) is less than 85% by weight of the blend.

9. The blend composition of claim 8, wherein component (b) is prepared using a Ziegler-Natta type catalyst and is a copolymer of ethylene and a comonomer selected from the group consisting of: 1-octane, 1-hexene, 1-butene, and mixtures thereof.

10. The blend composition of claim 8, wherein component (b) is prepared using a Ziegler-Natta type catalyst and is a copolymer of ethylene and a comonomer selected from the group consisting of:1-octene, 1-hexene, and mixtures thereof.

\* \* \* \* \*